(12) United States Patent
Gershon

(10) Patent No.: US 8,620,792 B2
(45) Date of Patent: *Dec. 31, 2013

(54) DEVICE, METHOD AND SYSTEM OF PRICING FINANCIAL INSTRUMENTS

(71) Applicant: David Gershon, Tel Aviv (IL)

(72) Inventor: David Gershon, Tel Aviv (IL)

(73) Assignee: Super Derivatives, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/713,200

(22) Filed: Dec. 13, 2012

(65) Prior Publication Data

US 2013/0103613 A1    Apr. 25, 2013

Related U.S. Application Data

(63) Continuation of application No. 12/983,992, filed on Jan. 4, 2011.

(60) Provisional application No. 61/291,942, filed on Jan. 4, 2010.

(51) Int. Cl.
*G06Q 40/00* (2012.01)
(52) U.S. Cl.
USPC .................................. 705/36; 705/35; 705/37
(58) Field of Classification Search
USPC ................................................ 705/35, 36, 37
See application file for complete search history.

(56) References Cited

U.S. PATENT DOCUMENTS 3,933,305 A    1/1976  Murphy
5,557,517 A    9/1996  Daughterty, III
(Continued)

FOREIGN PATENT DOCUMENTS

JP    H3-50687 A    3/1991
JP    10-509257    9/1998
(Continued)

OTHER PUBLICATIONS

Singh, Vipul Kumar; Ahmad, Naseem; "Forecasting Performance Volatility Models for Pricing S&P CNX Nifty Index Options via Black-Scholes Model"; Jul. 2011; UUP Journal Applied Finance v17n3; pp: 53-67; ISSN: 0972-5105.*

(Continued)

*Primary Examiner* — Alexander Kalinowski
*Assistant Examiner* — Edward Chang
(74) *Attorney, Agent, or Firm* — Shichrur & Co.

(57) ABSTRACT

Some demonstrative embodiments include methods, devices and systems of pricing financial instruments. In one embodiment, a pricing module may be configured to receive first input data corresponding to at least one parameter defining a first option on an underlying asset and second input data corresponding to at least one current market condition relating to said underlying asset, and, based on said first and second input data, to determine a price of the first option according to a volatility smile satisfying a first criterion relating to a sum of a first correction corresponding to the first option and a second correction corresponding to a second option representing a position opposite to a position of a the first option and having substantially a same absolute delta value as the first option, wherein the first correction relates to a difference between a theoretical price of the first option and the price of the first option according to the volatility smile, and wherein the second correction relates to a difference between a theoretical price of the second option and the price of the second option according to the volatility smile. Other embodiments are described and claimed.

28 Claims, 7 Drawing Sheets

(56) References Cited

U.S. PATENT DOCUMENTS

| | | | |
|---|---|---|---|
| 5,806,050 A | 9/1998 | Shinn et al. | |
| 5,873,071 A | 2/1999 | Ferstenberg et al. | |
| 5,926,801 A | 7/1999 | Matsubara et al. | |
| 5,946,667 A | 8/1999 | Tull, Jr. et al. | |
| 6,016,483 A | 1/2000 | Rickard et al. | |
| 6,061,662 A | 5/2000 | Makivic | |
| 6,161,096 A | 12/2000 | Bell | |
| 6,178,406 B1 | 1/2001 | Cheetham et al. | |
| 6,263,321 B1 * | 7/2001 | Daughtery, III | 705/36 R |
| 6,546,375 B1 | 4/2003 | Pang et al. | |
| 6,709,330 B1 | 3/2004 | Klein et al. | |
| 6,839,686 B1 | 1/2005 | Galant | |
| 6,912,511 B1 | 6/2005 | Eliezer et al. | |
| 7,177,833 B1 | 2/2007 | Marynowski et al. | |
| 7,212,997 B1 | 5/2007 | Pine et al. | |
| 7,251,629 B1 | 7/2007 | Marynowski et al. | |
| 2002/0073014 A1 | 6/2002 | Gilbert | |
| 2002/0073016 A1 | 6/2002 | Furbush et al. | |
| 2003/0208430 A1 | 11/2003 | Gershon | |
| 2005/0027634 A1 | 2/2005 | Gershon | |
| 2006/0259381 A1 | 11/2006 | Gershon | |
| 2009/0063358 A1 | 3/2009 | Smith | |

FOREIGN PATENT DOCUMENTS

| | | |
|---|---|---|
| JP | 2000507730 A1 | 6/2000 |
| JP | 2001-500653 | 1/2001 |
| JP | 2000500653 A1 | 1/2001 |
| WO | 9605566 A1 | 2/1996 |
| WO | 98/12658 A1 | 3/1998 |
| WO | 98/12659 A1 | 3/1998 |
| WO | 01/80131 | 10/2001 |

OTHER PUBLICATIONS

Orosi, Greg; "Improved Implementation of local volatility and its application to S&P 500 index options"; Spring 2010; Journal of Derivatives, v 17, n 3, p. 53(12); ISSN: 1074-1240.*
Abken, Peter A; Nandi, Sailat; "Options and volatility"; Dec. 1996; Economic Review (Federal Reserve Bank of Atlanta); v81 n3-6; pp. 21-35; ISSN: 0732-1813.*
Translation of Office Action for Japanese Patent Application No. 2013-029856 mailed on May 28, 2013; 2 pages.
Souicirou Moridaira, "Finance Course 4, Computational Finance," Japan, Kunizo Asakura, Asakura Publishing Co., Ltd., Jul. 20, 1997, the first edition, p. 115 and 116.
Internet Citation, "Track data announces its AIQ systems division released its option analysis", Nov. 9, 1999, XP002958101, retrieved on Jun. 15, 2002.
International Search Report dated Sep. 18, 2002 from PCT/IB01/01941.
Rodger D. Huang et al., "The Components of the Bid-Ask Spread: A General Approach", The Review of Financial Studies, Winter 1997; 10, 4.
Downes, John and Jordan Elliot Goodman, Barron's Dictionary of Finance and Investment Terms. "Derivative Pricing Models" and "Option Pricing" Copyright 1998.
Final Office Action for U.S. Appl. No. 11/797,691 mailed on Nov. 13, 2009.
Final Office Action for U.S. Appl. No. 11/797,692 mailed on Nov. 16, 2009.
Non-final Office Action for U.S. Appl. No. 11/797,692 mailed on May 20, 2010.
The Influence of Electronic Trading on Bid-Ask Spreads: New Evidence from European Bond Futures, The Journal of Fixed Income, vol. 8, No. 1; Jun. 1998.
Shiekh et al. "A characterization of the daily and intraday behavior of returns on options" Jun. 1994 Journal of Finance, v49, n2, p. 557(23).
Jex, Mark et al. "Pricing exotics under the smile", Risk, Nov. 1999.
Non-final Office Action for U.S. Appl. No. 11/797,692 mailed on Apr. 3, 2009.
Non-final Office Action for U.S. Appl. No. 11/797,691 mailed on Apr. 6, 2009.
Non-final Office Action for U.S. Appl. No. 10/220,159 mailed on Jun. 19, 2006.
Non-final Office Action for U.S. Appl. No. 10/220,159 mailed on Feb. 13, 2006.
Final Office Action for U.S. Appl. No. 10/220,159 mailed on Nov. 28, 2006.
Final Office Action for U.S. Appl. No. 12/762,340 mailed on Feb. 18, 2011.
Final Office Action for U.S. Appl. No. 11/797,692 mailed on Feb. 4, 2011.
Office Action for Indian Patent Application 320/CHENP/2007 mailed on Feb. 28, 2011.
Statement in accordance with the notice from the European Patent Office dated Oct. 1, 2007 concerning business methods (OJ Nov. 2007; p. 592-593) XP002456252.
Office Action for Japanese Patent Application 2001-577256 mailed on Jan. 27, 2011.
Takeaki Kariya, "Basics of Financial Engineering" Japan, Tokyo Keizai, Inc. Sep. 25, 1997, the first edition, p. 11 to 12.
Extended European Search Report for European Patent Application 10180297.3 mailed on Feb. 21, 2011.
Extended European Search Report for European Patent Application 10191976.9 mailed on Apr. 8, 2011.
Office Action for Australian Patent application 2001255394 mailed on Jan. 24, 2005.
Office Action for Canadian Patent application 2,406,418 mailed on Mar. 26, 2010.
International Preliminary Examination Report for PCT application PCT/US01/12264 mailed on Aug. 2, 2002.
Translation of Office Action for Japanese Patent application 2003-536956 received Jun. 22, 2007.
Fischer Black,"Fact and Fantasy in the use of Options," Financial Analysts Journal, 1975 p. 55-72.
Customized Listed Contracts: The CBOE's new customizable options contract business is getting good reviews from potential investors. Wall Street & Technology, p. 56. May 1993.
Using options the special way. Simons, Howard L. Futures (Cedar Falls, Iowa), v23 , n8 , p. 34(3) Jul. 1994.
International Preliminary Search Report for PCT application PCT/US01/12264 mailed on Jul. 13, 2001.
International Search Report and Written Opinion for PCT application PCT/IB11/50026 mailed on Jun. 27, 2011.
Office Action for JP 2008-211682 mailed on Aug. 16, 2011.
"Individual marketing ~ Diverse financial instruments for individual investors ~" by Kanenobu Iwatani, printed in vol. 4, No. 2 (pp. 249-257) Capital Market Quarterly published by Nomura Research Institute, Ltd. on Nov. 1, 2000.
<Covered warrant> ~ Warrant pricing errors by Goldman Sachs Administrative action taken, yet bond cancellation issue unresolved ~ printed in vol. 8, No. 12 (pp. 14-16) Nikkei Net Trading published on Aug. 15, 2001.
Office Action for U.S. Appl. No. 12/983,992 mailed on Mar. 29, 2012.
Translation of Office Action for Japanese Patent Application No. 2001-577256 mailed on Nov. 15, 2011.
Office Action for Canadian Patent Application No. 2,463,608 mailed on Jan. 10, 2012.
Office Action for European Patent Application No. 10191976.9 mailed on Jun. 21, 2012.
International Preliminary Report on Patentability for PCT International Application No. PCT/IB2011/050026 mailed on Jul. 12, 2012.
Interrogatory for Japanese Patent Application No. 2001-577256 mailed on Sep. 12, 2012; 3 pages.
Office Action for U.S. Appl. No. 13/168,980 mailed on Nov. 8, 2012; 26 pages.
English Translation of Office Action for Japanese Patent Application No. 2012-060705 mailed on Nov. 20, 2012; 3 pages.
Opinion of Yasuyuki Fuchida printed in Capital Market Quarterly published by Nomura Research Institute, Ltd. (pp. 3-5, No. 1, vol. 3 published on Aug. 1, 1999).

(56) References Cited

OTHER PUBLICATIONS

Option Trading ~ derivatives trading and risk management ~ edited by Japanese Bank and Financial Market Study Group and published on Feb. 9, 1995 by Japanese Financial and Fiscal Conditions Workshop (see pp. 94-97, 1st edition).

Office Action for Israeli Patent Application No. 152235 mailed on Feb. 20, 2013; 2 pages.

Sing, Vipul Kumar; Ahmad, Naseem; "Forecasting Performance Volatility Models for Pricing S&P CNX Nifty Index Options via Black-Scholes Model", Jul. 2011; UUP Journal Applied Finance v17n3; pp. 53-67; ISSN: 0972-5105.

Abken, Peter A; Nandi, Sailat; "Options and volatility"; Dec. 1996; Economic Review (Federal Reserve Bank of Atlanta); v81n3-6; pp. 21-35; ISSN: 0732-1813.

English Translation of Office Action dated Jul. 17, 2013 for Japanese Patent Application No. 2012-036460; 3 pages.

English Translation of Office Action dated Jun. 26, 2013 for Japanese Patent Application No. 2001-577256; 13 pages.

Final Office Action dated Aug. 15, 2013 for U.S. Appl. No. 13/168,980; 19 pages.

Kanenobu Iwatani; Individual Marketing—Diverse Financial Instruments for Individuai Investors; Capital Market Quarterly; vol. 4, No. 2 (pp. 249-257); published by Nomura Research Institute Ltd.; Nov. 1, 2000, 13 pages.

Covered Warrant—Warrant Pricing Errors by Goldman Sachs Administrative Action Taken, Yet Bond Cancellation Issue Unresolved; Nikkei Net Trading; vol. 8, No. 12 (pp. 14-16); published on Aug. 15, 2001; 7 pages.

Singh, Vipul Kumar; Ahmad, Naseem; "Forecasting Performance Volatility Models for Pricing S&P CNX Nifty Index Options via Black-Scholes Model"; Jul. 2011; UUP Journal Applied Finance vol. 17, No. 3 (pp. 53-67); ISSN; 0972-5105: 6 pages.

Orosi, Greg; "Improved Implementation of Local Volatility and Its Application to S&P 500 Index Options"; Spring 2010; Journal of Derivatives, vol. 17, No. 3 (p. 53), ISSN: 1074-1240; 13 pages.

Abken, Peter A; Nandi, Sailat; "Options and Volatility", Dec. 1996; Economic Review (Federal Reserve Bank of Atlanta); vol. 81, No. 3-6 (pp. 21-35); ISSN. 0732-1813, 8 pages.

European Search Report for European Patent Application No. 11728533.8; mailed on Jul. 12, 2013; 6 pages.

English translation of Office Action for Japanese Patent Application No. 2012-060705, mailed on Aug. 22, 2013, 3 pages.

Office Action for Canadian Patent Application No. 2,463,608, mailed on Oct. 3, 2013, 2 pages.

\* cited by examiner

DEVICE, METHOD AND SYSTEM OF PRICING FINANCIAL INSTRUMENTS

CROSS REFERENCE

The present application is a Continuation application of U.S. patent application Ser. No. 12/983,992, filed Jan. 4, 2011, which claims the benefit of and priority from U.S. Provisional Patent application 61/291,942, entitled "Method and system of pricing financial instruments", filed Jan. 4, 2010, the entire disclosures of all of which are incorporated herein by reference.

FIELD

The disclosure relates generally to financial instruments and, more specifically, to methods and systems for pricing, e.g., real-time pricing, of options and/or for providing automatic trading capabilities.

BACKGROUND

Pricing financial instruments is a complex art requiring substantial expertise and experience. Trading financial instruments, such as options, involves a sophisticated process of pricing typically performed by a trader.

The term "option" in the context of the present application is broadly defined as any financial instrument having option-like properties, e.g., any financial derivative including an option or an option-like component. This category of financial instruments may include any type of option or option-like financial instrument, relating to some underlying asset. Assets as used in this application include anything of value; tangible or non-tangible, financial or non-financial, for example, stocks; currencies; commodities, e.g., oil, metals, or sugar; interest rates; forward-rate agreements (FRA); swaps; futures; bonds; weather, e.g., the temperature at a certain area; electricity; gas emission; credit; mortgages; indices; and the like. For example, as used herein, options range from a simple Vanilla option on a single stock and up to complex convertible bonds whose convertibility depends on some key, e.g., the weather.

The term "Exchange" in the context of the present application relates to any one or more exchanges throughout the world, and includes all assets/securities, which may be traded in these exchanges. The terms "submit a price to the exchange", "submit a quote to the exchange", and the like generally refer to actions that a trader may perform to submit a bid and/or offer prices for trading in the exchange. The price may be transferred from the trader to the exchange, for example, by a broker, by online trading, on a special communication network, through a clearing house system, and/or using in any other desired system and/or method.

The price of an asset for immediate, e.g., 1 or 2 business days, delivery is called the spot price. For an asset sold in an option contract, the strike price is the agreed upon price at which the deal is executed if the option is exercised. For example, a stock option involves buying or selling a stock. The spot price is the current stock price on the exchange in which is the stock is traded. The strike price is the agreed upon price to buy/sell the stock if the option is exercised.

To facilitate trading of options and other financial instruments, a market maker suggests a bid price and offer price (also called ask price) for a certain option. The bid price is the price at which the market maker is willing to purchase the option and the offer price is the price at which the market maker is willing to sell the option. As a market practice, a first trader interested in a certain option may ask a second trader for a quote, e.g., without indicating whether the first trader is interested to buy or to sell the option. The second trader quotes both the bid and offer prices, not knowing whether the first trader is interested in selling or buying the option. The market maker may earn a margin by buying options at a first price and selling them at a second price, e.g., higher than the first price. The difference between the offer and bid prices is referred to as bid-offer spread.

A call option is the right to buy an asset at a certain price ("the strike") at a certain time, e.g., on a certain date. A put option is the right to sell an asset at a strike price at a certain time, e.g., on a certain date. Every option has an expiration time in which the option ceases to exist. Prior to the option expiration time, the holder of the option may determine whether or not to exercise the option, depending on the prevailing spot price for the underlying asset. If the spot price at expiration is lower than the strike price, the holder will choose not to exercise the call option and lose only the cost of the option itself. However, if the strike is lower than the spot, the holder of the call option will exercise the right to buy the underlying asset at the strike price making a profit equal to the difference between the spot and the strike prices. The cost of the option is also referred to as the premium.

A forward rate is defined as the predetermined rate or price of an asset, at which an agreed upon future transaction will take place. The forward rate may be calculated based on a current rate of the asset, a current interest rate prevailing in the market, expected dividends (for stocks), cost of carry (for commodities), and/or other parameters depending on the underlying asset of the option.

An at-the-money forward option (ATM) is an option whose strike is equal to the forward rate of the asset. In some fields, the at-the-money forward options are generically referred to as at-the-money options, as is the common terminology in the commodities and interest rates options. The at the money equity options are actually the at the money spot, i.e. where the strike is the current spot rate or price.

An in-the-money call option is a call option whose strike is below the forward rate of the underlying asset, and an in the-money put option is a put option whose strike is above the forward rate of the underlying asset. An out-of-the-money call option is a call option whose strike is above the forward rate of the underlying asset, and an out-of-the-money put option is a put option whose strike is below the forward rate of the underlying asset.

An exotic option, in the context of this application, is a generic name referring to any type of option other than a standard Vanilla option. While certain types of exotic options have been extensively and frequently traded over the years, and are still traded today, other types of exotic options had been used in the past but are no longer in use today. Currently, the most common exotic options include "barrier" options, "digital" options, "binary" options, "partial barrier" options (also known as "window" options), "average" options, "compound" options and "quanto" options. Some exotic options can be described as a complex version of the standard (Vanilla) option. For example, barrier options are exotic options where the payoff depends on whether the underlying asset's price reaches a certain level, hereinafter referred to as "trigger", during a certain period of time. The "pay off" of an option is defined as the cash realized by the holder of the option upon its expiration. There are generally two types of barrier options, namely, a knock-out option and a knock-in option. A knock-out option is an option that terminates if and when the spot reaches the trigger. A knock-in option comes into existence only when the underlying asset's price reaches the trigger. It is noted that the combined effect of a knock-out option with strike K and trigger B and a knock-in option with strike K and trigger B, both having the same expiration, is equivalent to a corresponding Vanilla option with strike K. Thus, knock-in options can be priced by pricing corresponding knock-out and vanilla options. Similarly, a one-touch option can be decomposed into two knock-in call options and two knock-in put options, a double no-touch option can be decomposed into two double knock-out options, and so on. It is appreciated that there are many other types of exotic options known in the art.

Certain types of options, e.g., Vanilla options, are commonly categorized as either European or American. A European option can be exercised only upon its expiration. An American option can be exercised at any time after purchase and before expiration. For example, an American Vanilla option has all the properties of the Vanilla option type described above, with the additional property that the owner can exercise the option at any time up to and including the option's expiration date. As is known in the art, the right to exercise an American option prior to expiration makes American options more expensive than corresponding European options.

Generally in this application, the term "Vanilla" refers to a European style Vanilla option. European Vanilla options are the most commonly traded options; they are typically traded over the counter (OTC). American Vanilla options are more popular in the exchanges and, in general, are more difficult to price.

U.S. Pat. No. 5,557,517 ("the '517 patent") describes a method of pricing American Vanilla options for trading in a certain exchange. This patent describes a method of pricing Call and Put American Vanilla options, where the price of the option depends on a constant margin or commission required by the market maker.

The method of the '517 patent ignores data that may affect the price of the option, except for the current price of the underlying asset and, thus, this method can lead to serious errors, for example, an absurd result of a negative option price. Clearly, this method does not emulate the way American style Vanilla options are priced in real markets.

The Black-Scholes (BS) model (developed in 1973) is a widely accepted method for valuing options. This model calculates a theoretical value (TV) for options based on the probability of the payout, which is commonly used as a starting point for approximating option prices. This model is based on a presumption that the change in the spot price of the asset generally follows a Brownian motion, as is known in the art. Using such Brownian motion model, known also as a stochastic process, one may calculate the theoretical price of any type of financial derivative, either analytically or numerically. For example, it is common to calculate the theoretical price of complicated financial derivatives through simulation techniques, such as the Monte-Carlo method, introduced by Boyle in 1977. Such techniques may be useful in calculating the theoretical value of an option, provided that a computer being used is sufficiently powerful to handle all the calculations involved. In the simulation method, the computer generates many propagation paths for the underlying asset, starting at the trade time and ending at the time of the option expiry. Each path is discrete and generally follows the Brownian motion probability, but may be generated as densely as necessary by reducing the time lapse between each move of the underlying asset. Thus, if the option is path-dependant, each path is followed and only the paths that satisfy the conditions of the option are taken into account. The end results of each such path are summarized and lead to the theoretical price of the derivative.

The original Black-Scholes model was derived for calculating theoretical prices of European Vanilla options, where the price of the option is described by a relatively simple formula. However, it should be understood that any reference in this application to the Black-Scholes model refers to use of the Black-Scholes model or any other suitable model for evaluating the behavior of the underlying asset, e.g., assuming a stochastic process (Brownian motion), and/or for evaluating the price of any type of option, including exotic options. Furthermore, this application is general and independent of the way in which the theoretical value of the option is obtained. It can be derived analytically, numerically, using any kind of simulation method or any other technique available.

For example, U.S. Pat. No. 6,061,662 ("the '662 patent") describes a method of evaluating the theoretical price of an option using a Monte-Carlo method based on historical data. The simulation method of the '662 patent uses stochastic historical data with a predetermined distribution function in order to evaluate the theoretical price of options. Examples is the '662 patent are used to illustrate that this method generates results which are very similar to those obtained by applying the Black-Scholes model to Vanilla options. Unfortunately, methods based on historical data alone are not relevant for simulating financial markets, even for the purpose of theoretical valuation. For example, one of the most important parameters used for valuation of options is the volatility of the underlying asset, which is a measure for how the price and/or rate of the underlying asset may fluctuate. It is well known that the financial markets use a predicted, or an expected, value for the volatility of the underlying assets, which often deviates dramatically from the historical data. In market terms, expected volatility is often referred to as "implied volatility", and is differentiated from "historical volatility". For example, the implied volatility tends to be much higher than the historical volatility of the underlying asset before a major event, such as risk of war, and in anticipation of or during a financial crisis.

It is appreciated by persons skilled in the art that the Black-Scholes model is a limited approximation that may yield results very far from real market prices and, thus, corrections to the Black-Scholes model must generally be added by traders. For example, in the Foreign Exchange (FX) Vanilla market, and in commodities, the market trades in volatility terms and the translation to option price is performed through use of the Black-Scholes formula. In fact, traders commonly refer to using the Black-Scholes model as "using the wrong volatility with the wrong model to get the right price".

In order to adjust the BS price, in the Vanilla market, traders use different volatilities for different strikes, i.e., instead of using one volatility per asset per expiration date, as is required by the BS model, a trader may use different volatility values for a given asset depending on the strike price. This adjustment is known as volatility "smile" adjustment. The origin of the term "smile", in this context, is the typical shape of the volatility vs. strike, which is similar to a flat "U" shape (smile).

The phrase "market price of an option" is used herein to distinguish between the single value produced by some known models, such as the Black-Scholes model, and the actual bid and offer prices traded in the real market. For example, for some options, the market bid side may be twice the Black-Scholes model price and the offer side may be three times the Black-Scholes model price.

Many exotic options are characterized by discontinuity of the payout and, therefore, a discontinuity in some of the risk parameters near the trigger(s). This discontinuity prevents an oversimplified model such as the Black-Scholes model from taking into account the difficulty in risk-managing the option. Furthermore, due to the peculiar profile of some exotic options, there may be significant transaction costs associated with re-hedging some of the risk factors. Existing models, such as the Black-Scholes model, completely ignore such risk factors.

Several options pricing models were introduced since 1973, but none of these models was able to replicate the market prices universally and/or consistently. The most famous pricing models include, the stochastic volatility model, which assumes that the volatility itself is another stochastic process correlated with the underlying process; the local volatility model, where the volatility is a function of time and the underlying asset; and Libor based models, such as BGM, which generate the swaption prices from the Libor rates which are correlated stochastic processes.

Many factors may be taken into account in calculating option prices and corrections. The term "Factor" is used herein broadly as any quantifiable or computable value relating to the subject option. Some of the notable factors are defined as follows.

Volatility ("Vol") is a measure of the fluctuation of the return realized on an asset, e.g., a daily return. An indication of the order of magnitude the volatility can be obtained by historical volatility, i.e., the standard deviation of the daily return of the assets for a certain past period.

However, the markets trade based on a volatility that reflects the market expectations of the standard deviation in the future. The volatility reflecting market expectations is called implied volatility. In order to buy/sell volatility one commonly trades Vanilla options. For example, in the foreign exchange market, the implied volatilities of ATM Vanilla options for frequently used option dates and currency pairs are available to users in real-time, e.g., via screens such as REUTERS, Bloomberg or directly from FX option brokers.

Volatility smile, as discussed above, relates to the behavior of the implied volatility with respect to the strike, i.e., the implied volatility as a function of the strike, where the implied volatility for the ATM strike is the given ATM volatility in the market. Typically the plot of the implied volatility as a function of the strike shows a minimum that looks like a smile. For example, usually in equity options the minimum volatility is below the ATM strike.

Delta is the rate of change in the price of an option in response to changes in the price of the underlying asset; in other words, it is a partial derivative of the option price with respect to the spot. For example, a 25 delta call option is defined as follows: if against buying the option on one unit of the underlying asset, 0.25 units of the underlying asset are sold, then for small changes in the underlying asset price, assuming all other factors are unchanged, the total change in the price of the option and the profit or loss generated by holding 0.25 units of the asset are null.

Vega is the rate of change in the price of an option or other derivative in response to changes in volatility, i.e., the partial derivative of the option price with respect to the volatility.

Volatility Convexity is the second partial derivative of the price with respect to the volatility, i.e. the derivative of the Vega with respect to the volatility, denoted dVega/dVol.

Straddle is a strategy, which includes buying Vanilla call and put options having the same strike price and the same expiration.

At-the-money Delta neutral straddle is a straddle wherein the Delta of the call option and the Delta of the put option have the same value with opposite sign. The buyer of the at-the-money Delta neutral straddle strategy is automatically Delta-hedged (protected from small changes in the price of the underlying asset).

Risk Reversal (RR) is a strategy, which includes buying a Vanilla call option and selling a Vanilla put option with the same expiration sand the same Delta with opposite sign. In some markets, the RR corresponds to the difference between the implied volatility of a call option and a put option with the same delta (in opposite directions). Traders in the currency and/or commodity option markets generally use 25delta RR, which is the difference between the implied volatility of a 25delta call option and a 25delta put option. Thus, 25delta RR may be calculated as follows:

$$25\text{delta } RR = \text{implied Vol}(25\text{delta call}) - \text{implied Vol}(25\text{delta put})$$

The 25delta RR may correspond to a combination of buying a 25 delta call option and selling a 25 delta put option. Accordingly, the 25delta RR may be characterized by a slope of Vega of such combination with respect to spot. Thus, the price of the 25delta RR may characterize the price of the Vega slope, since practically the convexity of 25delta RR at the current spot is close to zero. Therefore, the 25delta RR as defined above may be used to price the slope dVega/dspot.

Strangle is a strategy of buying call and put options with the same expiration. In some applications, the call and put options may have the same Delta with opposite signs. The strangle price can be presented as the average of the implied volatility of the call and put options. For example:

$$25\text{delta strangle} = 0.5(\text{implied Vol}(25\text{delta call}) + \text{implied Vol}(25\text{delta put}))$$

The 25delta strangle may be characterized by practically no slope of Vega with respect to spot at the current spot, but a lot of convexity, i.e., a change of Vega when the volatility changes. Therefore, it is used to price convexity.

Since the at-the-money Vol may be known, it is more common to quote the butterfly strategy, in which one buys one unit of the strangle and sells 2 units of the ATM 25 option. In some assets, the strangle/butterfly is quoted in terms of volatility. For example:

$$25\text{delta butterfly} = 0.5*(\text{implied Vol}(25\text{delta call}) + \text{implied Vol}(25\text{delta put})) - ATM \text{ Vol}$$

The reason it is more common to quote the butterfly rather than the strangles is that butterfly provides a strategy with almost no Vega but significant convexity. Since butterfly and strangle are related through the ATM volatility, which may be known, they may be used interchangeably. The 25delta put and the 25delta call can be determined based on the 25delta RR and the 25delta strangle. The ATM volatility, 25 delta risk reversal and/or the 25 delta butterfly may be referred to, for example, as the "Volatility Parameters". The Volatility Parameters may include any additional and/or alternative parameters and/or factors.

Bid/offer spread is the difference between the bid price and the offer price of a financial derivative. In the case of options, the bid/offer spread may be expressed, for example, either in terms of volatility or in terms of the price of the option. For example, the bid/ask spread of exchange traded options is quoted in price terms (e.g., cents, etc). The bid/offer spread of a given option depends on the specific parameters of the option. In general, the more difficult it is to manage the risk of an option, the wider is the bid/offer spread for that option.

In order to quote a price, traders typically try to calculate the price at which they would like to buy an option (i.e., the bid side) and the price at which they would like to sell the option (i.e., the offer side). Many traders have no computational methods for calculating the bid and offer prices, and so traders typically rely on intuition, experiments involving changing the factors of an option to see how they affect the market price, and past experience, which is considered to be the most important tool of traders.

One dilemma commonly faced by traders is how wide the bid/offer spread should be. Providing too wide a spread reduces the ability to compete in the options market and is considered unprofessional, yet too narrow a spread may result in losses to the trader. In determining what prices to provide, traders need to ensure that the bid/offer spread is appropriate. This is part of the pricing process, i.e., after the trader decides where to place the bid and offer prices, he/she needs to consider whether the resultant spread is appropriate. If the spread is not appropriate, the trader needs to change either or both of the bid and offer prices in order to show the appropriate spread.

Option prices that are quoted in exchanges typically have a relatively wide spread compared to their bid/ask spread in the OTC market, where traders of banks typically trade with each other through brokers. In addition the exchange price typically corresponds to small notional amounts of options (lots). A trader may sometimes change the exchange price of an option by suggesting a bid price or an offer price with a relatively small amount of options. This may result in the exchange prices being distorted in a biased way.

In contrast to the exchanges, the OTC option market has a greater "depth" in terms of liquidity. Furthermore, the options traded in the OTC market are not restricted to the specific strikes and expiration dates of the options traded in the exchanges. In addition, there are many market makers, which quote bid/offer prices, which are totally different from the bid/offer prices in the exchange.

One of the reasons that exchange prices of options are quoted with a wide spread is that the prices of options corresponding to many different strikes, and many different dates may change very frequently, e.g., in response to each change in the price of the underlying assets. As a result, the people that provide the bid and ask prices to the exchange have to constantly update a large number of bid and ask prices simultaneously, e.g., each time the price of the underlying assets changes. In order to avoid this tedious activity, it is mostly preferred to use "safe" bid and ask prices, which will not need to be frequently updated.

SUMMARY

Some demonstrative embodiments include devices, systems and/or methods of pricing financial instruments.

Although some embodiments are described herein with reference to pricing a Vanilla option, other embodiments may be implemented for pricing any other suitable exotic option, e.g., based on the pricing of a corresponding vanilla option.

Some demonstrative embodiments include methods, devices and/or systems implementing a pricing model for pricing, e.g., in real time, options in substantially all asset classes, for example, in a way that truly replicates the traded prices of the options, e.g., as traded in the interbank market.

In some demonstrative embodiments, a pricing module may receive first input data corresponding to at least one parameter defining an option on an underlying asset and second input data corresponding to at least one current market condition relating to the underlying asset.

In some demonstrative embodiments, the first input data may include an indication of at least one of a type of the option, an expiration date of the option, a trigger for the option, and a strike of the option.

In some demonstrative embodiments, the second input data may include an indication of at least one of a spot value, a forward rate, an interest rate, a volatility, an at-the-money volatility, a delta risk reversal, a delta butterfly, a delta strangle, a 10 delta risk reversal, a 10 delta butterfly, a 10 delta strangle, a 25 delta risk reversal, a 25 delta butterfly, a 25 delta strangle, a caplet, a floorlet, a swap rate, a security lending rate, and an exchange price.

In some demonstrative embodiments, the pricing module may price the option based on the first and second input data.

The Black Scholes (BS) model assumes that there is a single volatility for any maturity regardless of the strike and, that this single volatility, which reflects the rate of fluctuation of the price of the underlying asset, is constant throughout the life of the option. Therefore the BS model assumes that a trader only has to constantly re-hedge the price of the underlying asset, e.g., by always keeping the Delta amount of the underlying asset, in order to eliminate the price risk of the option. In reality, this assumption is not true. Typically, the volatility changes when the price of the underlying asset changes. Therefore, there is a different "volatility value" for different strikes. The BS model ignores the cost of rehedging the volatility changes.

In some demonstrative embodiments, the pricing module may consider the re-hedging of two "axes", e.g., which may be almost orthogonal to one another. A first "axis" may result from the fact that there is the volatility "smile", wherein the volatility may be affected by changes in the price of the underlying asset price. The first axis may be re-hedged, for example, using a risk reversal strategy. The second axis may result from a Vega hedged book becoming un-hedged, e.g., when the volatility changes. The second axis may be re-hedged, for example, using the strangle strategy.

In some demonstrative embodiments, the pricing module may price the option according to a volatility smile, which may satisfy one or more predefined criterions.

The term "volatility smile" as used herein relates to the behavior of the implied volatility with respect to the strike, i.e., the implied volatility as a function of the strike, where the implied volatility for the ATM strike is the given ATM volatility in the market. The plot of the implied volatility as a function of the strike may typically show a minimum that looks like a smile, e.g., usually in equity options the minimum volatility is below the ATM strike. However, the plot of the implied volatility as a function of the strike may have any other suitable behavior and/or shape, e.g., different from a "U" or "smile" shape.

In some demonstrative embodiments, the volatility smile may satisfy the criterions, for example, with respect to a pair of options forming a Delta neutral strategy, e.g., a first option including the option to be priced and a second option representing a position opposite to a position of a the first option and having substantially the same absolute delta value as the first option.

In some demonstrative embodiments, the volatility smile may satisfy the criterions, for example, with respect to each pair of options forming a Delta neutral strategy, e.g., including a first option and a second option representing a position opposite to a position of a the first option and having substantially the same absolute delta value as the first option.

In some demonstrative embodiments, the volatility smile may satisfy a first criterion relating to a sum of a first correction corresponding to the first option and a second correction corresponding to the second option.

In some demonstrative embodiments, the first correction relates to a difference between a theoretical price of the first option and the price of the first option according to the volatility smile, and the second correction relates to a difference between a theoretical price of the second option and the price of the second option according to the volatility smile. The theoretical value may be determined according to any suitable model, e.g., the BS model or any other model.

In some demonstrative embodiments, the first criterion may require that the sum of the first and second corrections is proportional to a sum of first and second volatility convexities corresponding to the first and second options, respectively.

In some demonstrative embodiments, the sum of the first and second volatility convexities is a predefined function of a volatility of the first option according to the volatility smile and a volatility of the second option according to the volatility smile.

In some demonstrative embodiments, the second criterion may require that the difference between the first and second corrections is proportional to a difference between first and second delta convexities corresponding to the first and second options, respectively.

In some demonstrative embodiments, the difference between the first and second delta convexities is a second predefined function of the volatility of the first option according to the volatility smile and the volatility of the second option according to the volatility smile.

In some demonstrative embodiments, the first criterion requires that the sum of the first and second corrections is proportional to the sum of first and second volatility convexities according to a first proportionality function, which is based on the delta.

In some demonstrative embodiments, the second criterion requires that the difference between the first and second corrections is proportional to the difference of the first and second delta convexities according to a second proportionality function, which is based on the delta.

In some demonstrative embodiments, at least one of the first and second proportionality functions includes a predefined combination of the delta and one or more market-based parameters.

In some demonstrative embodiments, the pricing module may determine the market-based parameters based on the second input data.

In some demonstrative embodiments, the first and second proportionality functions are decreasing functions of delta.

In some demonstrative embodiments, the first and second criterion require satisfying the following equations, respectively:

$$\zeta_C^\Delta + \zeta_P^\Delta = A(\Delta) \cdot Vega^\Delta d_1^2 \left( \frac{1}{\sigma_{K_{Call}}} + \frac{1}{\sigma_{K_{Put}}} \right)$$

$$\zeta_C^\Delta - \zeta_P^\Delta = B(\Delta) \cdot Vega^\Delta \frac{d_1}{S\sqrt{t}} \left( \frac{1}{\sigma_{K_{Call}}} + \frac{1}{\sigma_{K_{Put}}} \right)$$

wherein $\zeta_C^\Delta$ and $\zeta_P^\Delta$ denote the first and second corrections, wherein $\Delta$ denotes the delta, wherein $A(\Delta)$ and $B(\Delta)$ denote first and second functions of $\Delta$, respectively, wherein $Vega^\Delta$ denotes a Vega of the first and second options, wherein t denotes a time to expiration of the first option, wherein $d_1$ denotes a predefined function of the time to expiration of the first option, wherein S denotes a price of the underlying asset, and wherein $\sigma_{K_{Call}}$ and $\sigma_{K_{Put}}$ denote a volatility of the first option according to the volatility smile and a volatility of the second option according to the volatility smile, respectively.

In some demonstrative embodiments, the pricing module may determine a volatility of the first option based on the first and second criterions. For example, the pricing module may determine the volatility of the first option according to the volatility smile.

In some demonstrative embodiments, the pricing module may determine the first correction corresponding to the first option based on the volatility of the first option.

In some demonstrative embodiments, the pricing module may determine the price of the first option based on the first correction and the theoretical price of the first option, e.g., based on a sum of the theoretical price and the first correction.

In some demonstrative embodiments, the pricing module may determine a price of an exotic option on the underlying asset based on the volatility smile. For example, the pricing module may determine a price of a vanilla option on the underlying asset, e.g., according to the volatility smile described above, and determine the price of the exotic option based on the price of the vanilla option.

In some demonstrative embodiments, the pricing module may provide an output based on the price of the first option, e.g., in real time.

In some demonstrative embodiments, the pricing module may communicate the output via a communication network.

In some embodiments, a system may implement the pricing module to provide price information for substantially any suitable option on substantially any suitable asset based on input market data. The market data may be easily obtained, e.g., on a real time basis. Thus, a real-time price of any desired option may be determined, e.g., based on real time prices received from the exchanges and/or OTC market.

In some demonstrative embodiments, the price may be updated, e.g., substantially immediately and/or automatically, for example, in response to a change in spot prices and/or option prices. This may enable a user to automatically update prices for trading with the exchanges.

The trader may want, for example, to submit a plurality of bid and/or offer (hereinafter "bid/offer") prices for a plurality of options, e.g., ten bid/offer prices for ten options, respectively. When entering the bids/offers to a quoting system, the trader may check the price, e.g., in relation to the current spot prices, and may then submit the bids/offers to the exchange. Some time later, e.g., a second later, the spot price of the stock, which is the underlying asset of one or more of the options, may change. A change in the spot prices may be accompanied, for example, by changes in the volatility parameters, or may include just a small spot change while the volatility parameters have not changed. In response to the change in the spot price, the trader may want to update one or more of the submitted bid/offer prices. The desire to update the bid/offer prices may occur, e.g., frequently, during trade time.

The system implementing the pricing module according to some demonstrative embodiments, may automatically update the bid/offer prices entered by the trader, e.g., based on any desired criteria. For example, the system may evaluate the trader's bids/offers versus bid and offer prices of the options, which may be estimated by the system, e.g., when the trader submits the bid/offer prices. The system may then automatically recalculate the bid and/or offer prices, e.g., whenever the spot changes, and may automatically update the trader's bid/offer prices. The system may, for example, update one or more of the trader's bid/offer prices such that a price difference between the bid/offer price calculated by the pricing module and the trader's bid/offer price is kept substantially constant. According to another example, the system may update one or more of the trader's bid/offer prices based on a difference between the trader's bid/offer prices and an average of bid and offer prices calculated by the pricing module. The system may update one or more of the trader's bid/offer prices based on any other desired criteria.

It is noted, that a change of the spot price, e.g., of a few pips, may result in a change in one or more of the volatility parameters of options corresponding to the spot price. It will be appreciated that the system according to some embodiments, may enable automatically updating one or more option prices submitted by a trader, e.g., while taking into account the change in the spot price, in one or more of the volatility parameters, and/or in any other desired parameters, as described above.

In some demonstrative embodiments, the system may enable the trader to submit one or more quotes in the exchange in a form of relative prices vs. prices determined by the pricing module. For example, the trader may submit quotes for one or more desired strikes and/or expiry dates. The quotes submitted by the trader may be in any desired form, e.g., relating to one or more corresponding prices determined by the pricing module. For example, the quotes submitted by the trader may be in the terms of the bid/offer prices determined by the pricing module plus two basis points; in the terms of the mid market price determined by the pricing module minus four basis points, and the like. The system may determine the desired prices, for example, in real time, e.g., whenever a price change in the exchange is recorded. Alternatively, the system may determine the desired prices, according to any other desired timing scheme, for example, every predefined time interval, e.g., every half a second.

A change in a spot price of a stock may result in changes in the prices of a large number of options related to the stock. For example there could be over 200 active options relating to a single stock and having different strikes and expiration dates. Accordingly, a massive bandwidth may be required by traders for updating the exchange prices of the options in accordance with the spot price changes, e.g., in real time. This may lead the traders to submit to the exchange prices which may be "non-competitive", e.g., prices including a "safety-margin", since the traders may not be able to update the submitted prices according to the rate at which the spot prices, the volatility, the dividend, and/or the carry rate may change.

Some demonstrative embodiments, may allow automatically updating of one or more bid and/or offer prices submitted by a trader, e.g., as described above. This may encourage the traders to submit with the exchange more aggressive bid and/or offer prices, since the traders may no longer need to add the "safety margin" their prices for protecting the traders against the frequent changes in the spot prices. Accordingly, the trading in the exchange may be more effective, resulting in a larger number of transactions. For example, a trader may provide the system with one or more desired volatility parameter and/or rates. The trader may request the system to automatically submit and/or update bid and/or offer prices on desired amounts of options, e.g., whenever there is a significant change in the spot price and/or in the volatility of the market. The trader may also update some or all of the volatility parameters. The system may be linked, for example, to an automatic decision making system, which may be able to decide when to buy and/or sell options using the pricing module.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
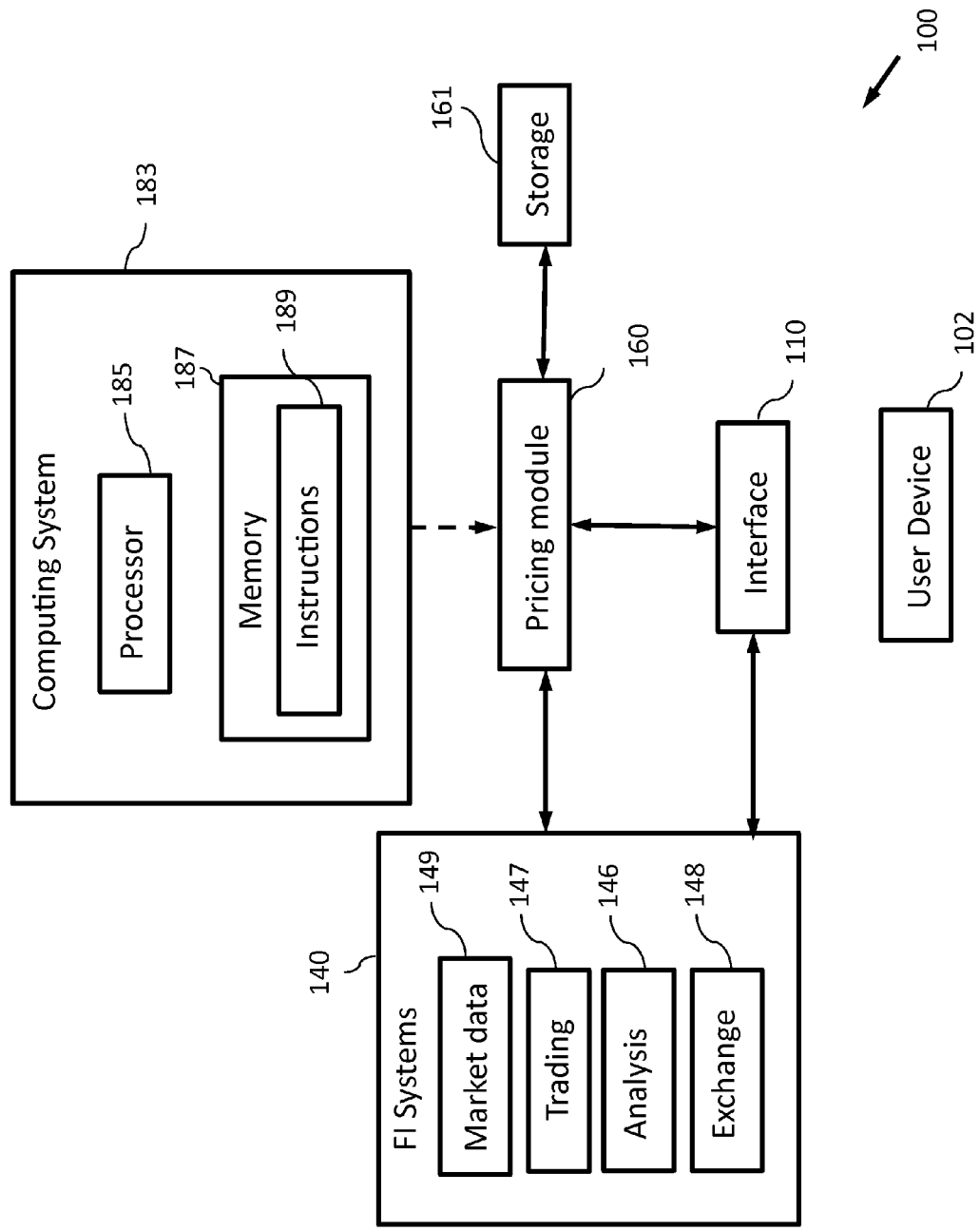
FIG. 1 is a schematic illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a cellular telephone, a wireless telephone, a Personal Communication Systems (PCS) device, a PDA device which incorporates a wireless communication device, a device having one or more internal antennas and/or external antennas, a wired or wireless handheld device (e.g., BlackBerry, Palm Treo), a Wireless Application Protocol (WAP) device, or the like.

Some demonstrative embodiments of the present invention are described herein in the context of a model for calculating a value, e.g., the market value, of a financial instrument, e.g., a stock option. It should be appreciated, however, that models in accordance with the invention may be applied to other options, financial instruments and/or markets, and the embodiments are not limited to stock options. One skilled in the art may apply the embodiments to other options and/or option-like financial instruments, e.g., options on interest rate futures, options on commodities, and/or options on non-asset instruments, such as options on the weather and/or the temperature, and the like, with variation as may be necessary to adapt for factors unique to a given financial instrument.

The term "financial instrument" may refer to any suitable "asset class", e.g., Foreign Exchange (FX), Interest Rate, Equity, Commodities, Credit, weather, energy, real estate, mortgages, and the like; and/or may involve more than one asset class, e.g., cross-asset, multi asset, and the like. The term "financial instrument" may also refer to any suitable combination of one or more financial instruments.

The term "derivative financial instrument" or "option" may refer to any suitable derivative instruments, e.g., forwards, swaps, futures, exchange options and OTC options, which derive their value from the value and characteristics of one or more underlying assets.

Reference is now made to FIG. 1, which schematically illustrates a block diagram of a system 100, in accordance with some demonstrative embodiments.

In some demonstrative embodiments, system 100 may include a pricing module ("pricing application") 160 to price one or more derivative financial instruments, e.g., as described below.

In some demonstrative embodiments, system 100 includes one or more user stations or devices 102, for example, a PC, a laptop computer, a PDA device, and/or a terminal, to allow one or more users to price the one or more financial assets using pricing module 160, e.g., as described herein.

In some demonstrative embodiments, devices 102 may be implemented using suitable hardware components and/or software components, for example, processors, controllers, memory units, storage units, input units, output units, communication units, operating systems, applications, or the like.

The user of device 102 may include, for example, a trader, a business analyst, a corporate structuring manager, a salesperson, a risk manager, a front office manager, a back office, a middle office, a system administrator, and the like.

In some demonstrative embodiments, system 100 may also include an interface 110 to interface between users 102 and one or more elements of system 100, e.g., pricing module 160. Interface 110 may optionally interface between users 102 and one or more Financial-Instrument (FI) systems and/or services 140. Services 140 may include, for example, one or more market data services 149, one or more trading systems 147, one or more exchange connectivity systems 148, one or more analysis services 146 and/or one or more other suitable FI-related services, systems and/or platforms.

In some demonstrative embodiments, pricing module 160 may be capable of communicating, directly or indirectly, e.g., via interface 110 and/or any other interface, with one or more suitable modules of system 100, for example, one or more of FI systems 140, a database, a storage, an archive, an HTTP service, an FTP service, an application, and/or any suitable module capable of providing, e.g., automatically, input to pricing module 160 and/or receiving output generated by pricing module 160, e.g., as described herein.

In some demonstrative embodiments, pricing module 160 may be implemented as part of FI systems/services 140, as part of device 102 and/or as part of any other suitable system or module, e.g., as part of any suitable server, or as a dedicated server.

In some demonstrative embodiments, pricing module 160 may include a local or remote application executed by any suitable computing system 183. For example, computing system 183 may include a suitable memory 187 having stored-thereon pricing-application instructions 189; and a suitable processor 185 to execute instructions 189 resulting in pricing module 160.

In some demonstrative embodiments, computing system 183 may include or may be part of a server to provide the functionality of pricing module 160 to users 102. In other embodiments, computing system 183 may be implemented as part of user station 102. For example, instructions 189 may be downloaded and/or received by users 102 from another computing system, such that pricing module 160 may be locally-executed by users 102. For example, instructions 189 may be received and stored, e.g., temporarily, in a memory or any suitable short-term memory or buffer of user device 102, e.g., prior to being executed by a processor of user device 102. In other embodiments, computing system 183 may include any other suitable computing arrangement, server and/or scheme.

In some demonstrative embodiments, computing system 183 may also execute one or more of FI systems/services 140. In other embodiments, pricing application 160 may be implemented separately from one or more of FI systems/services 140.

In some demonstrative embodiments, interface 110 may be implemented as part of pricing module 160, FI systems/services 140 and/or as part of any other suitable system or module, e.g., as part of any suitable server.

In some demonstrative embodiments, interface 110 may be associated with and/or included as part of devices 102. In one example, interface 110 may be implemented, for example, as middleware, as part of any suitable application, and/or as part of a server. Interface 110 may be implemented using any suitable hardware components and/or software components, for example, processors, controllers, memory units, storage units, input units, output units, communication units, operating systems, applications. In some demonstrative embodiments, interface 110 may include, or may be part of a Web-based pricing application interface, a web-site, a web-page, a stand-alone application, a plug-in, an ActiveX control, a rich content component (e.g., a Flash or Shockwave component), or the like.

In some demonstrative embodiments, interface 110 may also interface between users 102 and one or more of FI systems and/or services 140.

In some demonstrative embodiments, interface 110 may be configured to allow users 102 to enter commands; to define a derivative financial instrument to be priced by pricing module 160; to define and/or structure a trade corresponding to the derivative financial instrument; to receive a pricing of the derivative financial instrument from pricing module 160; to analyze the trade; to transact the trade; and/or to perform any other suitable operation.

In some demonstrative embodiments, pricing module 160 may be capable of pricing, e.g., accurately and/or in real-time, an option, e.g., any suitable Vanilla option, on any suitable underlying asset, e.g. options on currencies, interest rates, commodities, equity, energy, credit, weather, and the like.

In some demonstrative embodiments, given the price of European Vanilla options, one can obtain the probability function, denoted $P(S_T)$, which represents the probability that the price of underlying asset at time T to be $S_T$, e.g., regardless of the pricing model. For example, since:

$$Price_{Call} = df_R \int_K^\infty dS_T (S_T - K) \cdot P(S_T) \quad (1)$$

then:

$$P(S_T) = \frac{\partial^2 Price_{Call}}{\partial K^2} \quad (2)$$

wherein $Price_{call}$ denotes the price of a call option, $df_R$ denotes a factor for time T calculated using a term currency annual interest rate R, and K denotes the strike price.

Accordingly, in some demonstrative embodiments, pricing module 160 may use the probability function obtained from the vanilla model to calculate the price of any other suitable, e.g., exotic, option via, for example, a suitable Monte Carlo simulation.

Hence, although some embodiments are described herein with reference to pricing a Vanilla option, it will be appreciated that other embodiments may be implemented for pricing any other suitable exotic option, e.g., based on the pricing of a corresponding vanilla option.

In some demonstrative embodiments, pricing module 160 may implement the pricing model described below for pricing, in real time, options in substantially all asset classes in a way that truly replicates the traded prices of the options, e.g., as traded in the interbank market.

In some demonstrative embodiments, pricing module 160 may calculate one or more values of the volatility parameter, denoted $\sigma=\sigma(K)$, for one or more strikes K, e.g., for each strike K; and determine the price of the option based on the calculated volatility parameters, for example, by applying the Black-Scholes (BS) model, or any other suitable model, to the determined volatility parameters, e.g., as described in detail below.

In some demonstrative embodiments, pricing module 160 may determine a correction to be applied to a theoretical value of the option. The theoretical value may be determined according to any suitable model, e.g., the BS model or any other model.

In some demonstrative embodiments, pricing module 160 may price the option according to a volatility smile, which may satisfy one or more predefined criterions.

In some demonstrative embodiments, the volatility smile may satisfy the criterions, for example, with respect to a pair of options forming a Delta neutral strategy. For example, the pair of options may include, for example, a first option, e.g., the option to be priced, and a second option representing a position opposite to a position of a the first option and substantially the same absolute delta value as the first option. The term "absolute delta value" as used herein relates to an absolute of the delta. For example, first and second delta values may be the same of they have substantially the same absolute value, regardless of the sign.

In some demonstrative embodiments, the volatility smile may satisfy the criterions, for example, with respect to each pair of options including a first option and a second option representing a position opposite to a position of a the first option and having substantially the same absolute delta value as the first option.

In some demonstrative embodiments, the volatility smile may satisfy a first criterion relating to a sum of a first correction corresponding to the first option and a second correction corresponding to the second option.

In some demonstrative embodiments, the first correction relates to a difference between a theoretical price of the first option and the price of the first option according to the volatility smile, and the second correction relates to a difference between a theoretical price of the second option and the price of the second option according to the volatility smile, e.g., as described in detail below.

In some demonstrative embodiments, the notation $d_1$ may be defined as follows:

$$d_1 = \frac{\log(F/K)}{\sigma\sqrt{t}} + \frac{1}{2}\sigma\sqrt{t} \quad (3)$$

wherein F denotes the forward rate, and t denotes the time to expiration of the option.

The BS model for Vanilla call and put options may be represented using the notation $d_1$, e.g., as follows:

$$BS^{Call}=df_R(FN(d_1)-KN(d_1-\sigma\sqrt{t})) \quad (4)$$

$$BS^{Put}=df_R(-FN(-d_1)+KN(-d_1+\sigma\sqrt{t})) \quad (5)$$

wherein $BS^{Call}$ denotes the BS value of the call option, $BS^{Put}$ denotes the BS value of the put option, and wherein N(x) denotes the cumulative normal distribution function of x, e.g., as follows:

$$N(x) = \int_{-\infty}^{x} \frac{e^{-t^2/2}}{\sqrt{2\pi}} dt \quad (6)$$

The BS values $BS^{Call}$ and $BS^{Put}$ according to Equations 4 and 5 may represent the respective prices of a call option to buy and a put option to sell one unit of asset at the predetermined strike price K at a predetermined expiration date t.

The delta of a call option and a put option, denoted $\Delta_{Call}$ and $\Delta_{Put}$, respectively, i.e., the rate of change in the price of the call option and the put option, respectively, in response to changes in the price of the underlying asset, may be determined as follows:

$$\Delta_{Call}=df_L \cdot N(d_1) \quad (7)$$

$$\Delta_{Put}=-df_L \cdot N(-d_1) \quad (8)$$

wherein $df_L$ is a discount factor, which is calculated using a base annual interest like rate L. For example, in stocks L is the dividend rate, in commodities L is the carry or convenience rate, and in currencies L is the base currency interest rate. The discount factors $df_L$ and $df_R$ may be related by the formula $F=S \cdot df_L/df_R$, wherein S is the current price (rate) of the asset.

Accordingly, a call option and a put option having the same delta satisfy the following condition:

$$d_1(K_{Call}) = -d_1(K_{Put}) \quad (9)$$

wherein $K_{Call}$ denotes the strike of the call option, and $K_{Put}$ denotes the strike of the put option.

In some demonstrative embodiments, the rate of change, denoted Vega, in the price of an option in response to changes in the volatility may be defined as follows:

$$\text{Vega} = df_L \cdot S\sqrt{t} \cdot n(d_1) \quad (10)$$

wherein n(t) denotes the normal probability density function of t, e.g., as follows:

$$n(t) = \frac{e^{-t^2/2}}{\sqrt{2\pi}} \quad (11)$$

In some demonstrative embodiments, a first strategy ("same delta Risk Reversal") may be defined to include buying a call option and selling a put option having a delta of the same value and an opposite sign of the delta of the call option; and a second strategy ("same delta strangle") may be defined to include buying a call option and buying a put option having a delta of the same value and an opposite sign of the delta of the call option. According to Equations 9 and 10, a put option and a call option having the same delta with opposite signs may also have the same Vega (hereinafter referred to as "having the same delta"). Accordingly, the derivatives of the Vega of the first and second strategies may satisfy the following conditions:

$$\frac{\partial Vega_{Call}^\Delta}{\partial S} - \frac{\partial Vega_{Put}^\Delta}{\partial S} = -df_L \cdot n(d_1) \cdot d_1 \left( \frac{1}{\sigma_{K_{Call}}} + \frac{1}{\sigma_{K_{Put}}} \right) == \quad (12)$$

$$-Vega^\Delta \frac{d_1}{S\sqrt{t}} \left( \frac{1}{\sigma_{K_{Call}}} + \frac{1}{\sigma_{K_{Put}}} \right)$$

and:

$$\frac{\partial Vega_{Call}^\Delta}{\partial \sigma} + \frac{\partial Vega_{Put}^\Delta}{\partial \sigma} = df_L \cdot S\sqrt{t} \cdot N(d_1) \cdot d_1^2 \left( \frac{1}{\sigma_{K_{Call}}} + \frac{1}{\sigma_{K_{Put}}} \right) == \quad (13)$$

$$Vega^\Delta d_1^2 \left( \frac{1}{\sigma_{K_{Call}}} + \frac{1}{\sigma_{K_{Put}}} \right)$$

wherein $Vega_{Call}^\Delta$ and $Vega_{Put}^\Delta$ denote the value of Vega for the call and put options, respectively, on the same underlying asset and having the same Delta.

The BS model assumes that there is a single volatility for any maturity regardless of the strike and, that this single volatility, which reflects the rate of fluctuation of the price of the underlying asset, is constant throughout the life of the option. Therefore the BS model assumes that a trader only has to constantly re-hedge the price of the underlying asset (by always keeping the Delta amount of the underlying asset) in order to eliminate the price risk of the option. It is well known that in reality this assumption is not true. Typically the volatility changes when the price of the underlying asset changes. Therefore, there is a different "volatility value" for different strikes. The BS model ignores the cost of rehedging the volatility changes.

In some demonstrative embodiments, pricing module 160 may implement a pricing model ("the Gershon model"), which may at least partially fix this flaw of the BS model, e.g., as described herein.

In some demonstrative embodiments, the Gershon model may consider the re-hedging of two "axes", e.g., which may be almost orthogonal to one another. A first "axis" may result from the fact that there is the volatility "smile", wherein the volatility may be affected by changes in the price of the underlying asset price. The first axis may be re-hedged using the risk reversal. The second axis may result from a Vega hedged book becoming un-hedged, e.g., when the volatility changes. The second axis may be re-hedged using the strangle.

In some demonstrative embodiments, the Delta neutral straddle strategy may be defined to include call and put options with the same strike, denoted $K_0$, at which:

$$\Delta_{Call}^{(K_0)} = -\Delta_{Put}^{(K_0)} \quad (14)$$

Therefore, $d_1 = 0$ and $$K_0 = Fe^{\frac{1}{2}\sigma^2 t}.$$

According to this definition, the Delta, denoted $\Delta_0$, of the call or the put of the Delta neutral straddle strategy is:

$$\Delta_0 = df_L / 2 \quad (15)$$

The volatility, denoted $\sigma_0$, may be defined as the volatility, which, if substituted in the BS model for the strike $K_0$, yields the market price of the option with the strike $K_0$.

In some demonstrative embodiments, the Gershon model may implement a correction ("Zeta"), denoted $\zeta$, to be added to the value of an option determined according to the BS model ("the BS value"), e.g., a difference between the value of the option according to the Gershon model ("the market price") at the strike K, and the BS value with the volatility $\sigma_0$ that is used in the BS model for the strike of the at-the-money Delta neutral straddle. The correction $\zeta$, may be defined, for example, as follows:

$$\zeta = \text{Market price}(K) - BS(K) \quad (16)$$

In some demonstrative embodiments, the Gershon model may assume that $\sigma_o$ is the BS volatility such that $BS^C(\sigma_0, K_0)$ generates the correct market price for the strike $K_0$.

In some demonstrative embodiments, the correction, denoted $\zeta_C$, via the function $\sigma(K)$ to the call option may be represented as follows:

$$\zeta_C(K) = BS^{Call}(\sigma_K, K) - BS^{Call}(\sigma_0, K) \quad (17)$$

In some demonstrative embodiments, the correction, denoted $\zeta_p$, via the function $\sigma(K)$ to the put option may be represented as follows:

$$\zeta_P(K) = BS^{Put}(\sigma_K, K) - BS^{Put}(\sigma_0, K) \quad (18)$$

By definition of the corrections $\zeta_C$, and $\zeta_p$, the corrections $\zeta_C$ and $\zeta_p$ at $K_0$ satisfy $\zeta_C^{\Delta_0} = \zeta_P^{\Delta_0} = 0$. It is noted, that since buying a call option together with selling a put option with the same strike is equivalent to entering a forward deal at a forward rate equal the strike, the value of the correction $\zeta_C$ for the call option is identical to the value of the correction $\zeta_P$ for the put option with the same strike, e.g., regardless of the pricing model.

In some demonstrative embodiments, the sum of the first and second corrections may be proportional to the sum of first and second volatility convexities corresponding to the first and second options, respectively, according to a first proportionality function, which is based on the delta.

For example, the correction of the strangle strategy, which is the sum of the corrections $\zeta$ corresponding to the call and put options on the same underlying asset and having the same Delta, may be proportional to the sum of the derivatives of Vega with respect to the volatility, in accordance with Equation 13, e.g., as follows:

$$\zeta_C^\Delta + \zeta_P^\Delta = A(\Delta) \cdot Vega^\Delta d_1^2 \left( \frac{1}{\sigma_{K_{Call}}} + \frac{1}{\sigma_{K_{Put}}} \right) \quad (19)$$

wherein $A(\Delta)$ denotes a first proportionality function of $\Delta$, e.g., as described below.

In some demonstrative embodiments, the difference between the first and second corrections may be proportional to the difference of first and second delta convexities corresponding to the first and second options, respectively, according to a second proportionality function, which is based on the delta.

The term "Delta convexity" as used herein may relate to a derivative of Vega with respect to the spot S.

For example, the correction of the risk-reversal strategy, which is the difference between the corrections corresponding to the call and put options on the same underlying asset and having the same Delta, may be proportional to the difference of the derivatives of Vega with respect to S, for example, in accordance with Equation 12, e.g., as follows:

$$\zeta_C^\Delta - \zeta_P^\Delta = B(\Delta) \cdot Vega^\Delta \frac{d_1}{S\sqrt{t}} \left( \frac{1}{\sigma_{K_{Call}}} + \frac{1}{\sigma_{K_{Put}}} \right) \quad (20)$$

wherein $B(\Delta)$ denotes a second proportionality function of $\Delta$, e.g., as described below.

In some demonstrative embodiments, the functions $A(\Delta)$ and $B(\Delta)$ are decreasing functions of $\Delta$ and have to satisfy market conditions, e.g., as described in detail below. The functions $A(\Delta)$ and $B(\Delta)$ may depend on any suitable parameters and/or factors, e.g., the time to expiration t, and the like.

In some demonstrative embodiments, the proportionality functions $A(\Delta)$ and/or $B(\Delta)$ may include a predefined combination of the delta and one or more market-based parameters.

In some demonstrative embodiments, module 160 may determine the market-based parameters based on the second input data.

In some demonstrative embodiments, the market-based parameters of the proportionality functions $A(\Delta)$ and/or $B(\Delta)$ may depend on the maturity f the option and/or any other suitable factor, e.g., except for the strike, d or the volatility. In other embodiments, the market-based parameters may depend on any other suitable factor.

In some demonstrative embodiments, the proportionality functions $A(\Delta)$ and/or $B(\Delta)$ may be decreasing functions of delta.

In some demonstrative embodiments, the market date may relate to a plurality of option prices may be obtained from the market. The market-based parameters of the proportionality functions $A(\Delta)$ and/or $B(\Delta)$ may be determined by fitting he proportionality functions $A(\Delta)$ and/or $B(\Delta)$ to the market data. Equations 19 and 20 may then be used with the determined proportionality functions $A(\Delta)$ and/or $B(\Delta)$ to price an option of any suitable strike, e.g., as described herein.

In one embodiment, in the market of currency options (FX), the $25\Delta$ risk reversal and $25\Delta$ butterfly may be traded. Hence, the functions $A(\Delta)$ and/or $B(\Delta)$ may be determined such that Equations 19 and 20 satisfy the traded $25\Delta$ risk reversal and $25\Delta$ butterfly of the market. Optionally, a number of free parameters in the functions $A(\Delta)$ and/or $B(\Delta)$ may be selected to satisfy additional conditions. For example, in some currency pairs, additional delta values may be traded in the market, e.g., the $10\Delta$ risk reversal and/or the $10\Delta$ butterfly. Accordingly, the functions $A(\Delta)$ and/or $B(\Delta)$ may be determined such that Equations 19 and 20 satisfy the $10\Delta$ risk reversal and/or the $10\Delta$ butterfly of the market.

In another embodiment, in the market of Equity, the functions $A(\Delta)$ and/or $B(\Delta)$ may be determined depending on a plurality of strike prices of options traded in the market. For example, the functions $A(\Delta)$ and/or $B(\Delta)$ may be determined by requiring a best fit between the prices according to Equations 19 and 20 and between the exchange prices of the plurality of strikes and/or depending on suitable fixed strikes that are more liquid.

In another embodiment, in the interest rates caps and floors market, the functions $A(\Delta)$ and/or $B(\Delta)$ may be determined based on the caplets/floorlets to generate the correct market prices for the caps and floors.

In another embodiment, in the Swaptions market the functions $A(\Delta)$ and/or $B(\Delta)$ may be determined based on a best fit for swaption prices of the same swap length and the same expiration with different strikes (fixed rate of the swap), which are typically denoted by a difference, in basis points, from the at-the-money forward strike.

In one example, the functions $A(\Delta)$ and $B(\Delta)$ may defined as follows, e.g., for $\Delta_0 > \Delta$:

$$A(\Delta) = \alpha_1 e^{-\beta_1 (\Delta_0 - \Delta)} \quad (21)$$

$$B(\Delta) = \alpha_2 e^{-\beta_2 (\Delta_0 - \Delta)} \quad (22)$$

wherein $\alpha_1, \alpha_2, \beta_1, \beta_2$ denote four respective market parameters to be determined, e.g., based on the traded market data.

It is noted, that there may be no need to handle the situation of $\Delta_0 < \Delta$, e.g., since Equations 19 and 20 are simultaneously solved for both call and put options, e.g., as described below, and, therefore, $\Delta_0$ is the maximal Delta to be handled.

In some demonstrative embodiments, pricing module 160 may implement the Gershon model to determine the volatility $\sigma_{K_{Call}}$ corresponding to a given a strike $K_{Call} > K_0$, for example, by solving the following equation:

$$\zeta_P(\sigma_{K_{Put}}, K_{Put}) = \zeta_C(\sigma_{K_{Call}}, K_{Call}) \cdot \frac{1 - B(\Delta)/A(\Delta) \cdot S\sqrt{t} \cdot d_1}{1 + B(\Delta)/A(\Delta) \cdot S\sqrt{t} \cdot d_1} \quad (23)$$

wherein $\sigma_{K_{Put}}$ denotes the volatility of a put option at the strike $K_{Put} < K_0$, which may be determined, e.g., based on Equations 19 and 20, for example, as follows:

$$\sigma_{K_{Put}} = \left( 2\zeta_C(K_{Call}, \sigma_{K_{Call}}) / \left( Vega^\Delta d_1^2 \left( A(\Delta) + \frac{B(\Delta)}{S\sqrt{t} \cdot d_1} \right) \right) - \frac{1}{\sigma_{K_{Call}}} \right)^{-1} \quad (24)$$

wherein the strike $K_{Put}$ may be determined, e.g., based on Equations 3 and 9, for example, as follows:

$$K_{Put} = F e^{\left( d_1 \sigma_{K_{Put}} \sqrt{t} + 1/2 \sigma^2_{K_{Put}} \cdot t \right)} \quad (25)$$

and wherein, as mentioned above:

$$\Delta = \Delta(d_1); \quad d_1 = \frac{\log(F/K_{Call})}{\sigma_{K_{Call}}\sqrt{t}} + \frac{1}{2}\sigma_{K_{Call}}\sqrt{t} \quad (26)$$

In some demonstrative embodiments, Equation 23 may be solved, e.g., using any suitable numerical method or algorithm, to determine the value of $\sigma_{K_{Call}}$.

Additionally or alternatively, pricing module 160 may implement the Gershon model to determine the volatility $\sigma_{K_{Put}}$ corresponding to the given strike $K_{Put} < K_0$, since Equations 19 and 20 are symmetric with respect to the call and put options. For example, the volatility $\sigma_{K_{Put}}$ may be determined explicitly by solving the following equation:

$$\zeta_C(\sigma_{K_{Call}}, K_{Call}) = \zeta_P(\sigma_{K_{Put}}, K_{Put}) \cdot \frac{1 - B(\Delta)/A(\Delta) \cdot S\sqrt{t} \cdot d_1}{1 + B(\Delta)/A(\Delta) \cdot S\sqrt{t} \cdot d_1} \quad (27)$$

wherein, e.g., based on Equations 19 and 20:

$$\sigma_{K_{Call}} = \quad (28)$$

$$\left(2\zeta_P(K_{Put}, \sigma_{K_{Put}}) \bigg/ \left(Vega^\Delta d_1^2 \left(A(\Delta) - \frac{B(\Delta)}{S\sqrt{t} \cdot d_1}\right)\right) - \frac{1}{\sigma_{K_{Put}}}\right)^{-1}$$

wherein, e.g., based on Equation 3:

$$K_{Call} = Fe^{\left(-d_1 \sigma_{K_{Call}} \sqrt{t} + 1/2 \sigma_{K_{Call}}^2 \cdot t\right)} \quad (29)$$

and wherein, as mentioned above:

$$-d_1 = \frac{\log(F/K_{Put})}{\sigma_{K_{Put}}\sqrt{t}} + \frac{1}{2}\sigma_{K_{Put}}\sqrt{t} \quad (30)$$

In some demonstrative embodiments, Equation 27 may be solved, e.g., using any suitable numerical method or algorithm, to determine the value of $\sigma_{K_{Put}}$.

Following is an example, in accordance with one embodiment, of determining the functions $A(\Delta)$ and $B(\Delta)$ using the 25 delta strikes. However, it will be appreciated that in other embodiments the functions $A(\Delta)$ and $B(\Delta)$ may be determined in any other suitable manner, e.g., using any suitable data and/or parameters.

In some markets, e.g., the currencies and/or commodities markets, the 25 delta strikes may be traded. Accordingly, the values of $\sigma_{25\Delta C}$ and $\sigma_{25\Delta P}$ for the call and put options, respectively, may be received from the market. The values of the functions $A(\Delta)$ and $B(\Delta)$ at the 25 delta strikes may be determined, for example, since at the 25 delta $0.25 = df_L \ N(d_1)$, then:

$$d_1 = N^{-1}(0.25/df_L) \quad (31)$$

$$Vega^{25\Delta} = df_L S\sqrt{t} \cdot n(N^{-1}(0.25/df_L)) \quad (32)$$

-continued $$A(\Delta = 25) = \quad (33)$$

$$\frac{(\zeta_C^{25\Delta} + \zeta_P^{25\Delta})}{df_L S\sqrt{t} \cdot n(N^{-1}(0.25/df_L)) \cdot} == \alpha_1 e^{-\beta_1(0.5 df_L - 0.25)}$$

$$(N^{-1}(0.25/df_L))^2 \left(\frac{1}{\sigma_{25\Delta C}} + \frac{1}{\sigma_{25\Delta P}}\right)$$

$$B(\Delta = 25) = \quad (34)$$

$$\frac{(\zeta_C^{25\Delta} - \zeta_P^{25\Delta})}{df_L \cdot n(N^{-1}(0.25/df_L)) \cdot} == \alpha_2 e^{-\beta_2(0.5 df_L - 0.25)}$$

$$(N^{-1}(0.25/df_L)) \cdot \left(\frac{1}{\sigma_{25\Delta C}} + \frac{1}{\sigma_{25\Delta P}}\right)$$

The values, denoted BS(25Δcall) and BS(25Δput), of the respective 25 delta call and put options according to the BS model may be determined, for example, by substituting d1 of Equation 31 into Equations 4 and 5, as follows:

$$BS(25\Delta\text{call}) = 0.25S - K_{25\Delta C} \cdot df_R N(N^{-1}(0.25/df_L) - \sigma_{25\Delta c} \cdot \sqrt{t}) \quad (35)$$

$$BS(25\Delta\text{put}) = -0.25S + K_{25\Delta P} \cdot df_R N(N^{-1}(0.25/df_L) + \sigma_{25\Delta p} \cdot \sqrt{t}) \quad (36)$$

wherein:

$$K_{put}^{25\Delta} = Fe^{(N^{-1}(0.25/df_L) \cdot \sigma_{25\Delta P} \sqrt{t} + \frac{1}{2}\sigma_{25\Delta P}^2 t)} \quad (37)$$

$$K_{call}^{25\Delta} = Fe^{-(N^{-1}(0.25/df_L) \cdot \sigma_{25\Delta c} \sqrt{t} - \frac{1}{2}\sigma_{25\Delta c}^2 t)} \quad (38)$$

Accordingly:

$$BS(25\Delta\text{call}) == 0.25S - df_R F e^{-(N^{-1}(0.25/df_L) \cdot \sigma_{25\Delta c} \sqrt{t} - \frac{1}{2}\sigma_{25\Delta c}^2 t)} \cdot \quad (39)$$
$$N(N^{-1}(0.25/df_L) - \sigma_{25\Delta c}^2 \cdot t)$$

$$BS(25\Delta\text{put}) == -0.25S + df_R F e^{(-N^{-1}(0.25/df_L) \cdot \sigma_{25\Delta P} \sqrt{t} - \frac{1}{2}\sigma_{25\Delta P}^2 t)} \cdot \quad (40)$$
$$N(N^{-1}(0.25/df_L) + \sigma_{25\Delta P}^2 \cdot t)$$

The corrections $\zeta_{25\Delta C}$ and $\sigma_{25\Delta P}$ corresponding to the call and put options at the 25 delta strike may be determined, e.g., based on the above-listed Equations, for example, as follows:

The values of $d_1$ corresponding to the call and put options at the 25 delta strike may be determined, for example, as follows:

$$d_{1_{25\Delta C}}^0 = \quad (41)$$

$$\frac{\log(F/K) + \frac{1}{2}\sigma_0^2 t}{\sigma_0 \sqrt{t}} == N^{-1}(0.25/df_L)\frac{\sigma_{25\Delta C}}{\sigma_0} + \frac{1}{2}\left(\sigma_0 - \frac{\sigma_{25\Delta C}^2}{\sigma_0}\right)\sqrt{t}$$

$$d_{1_{25\Delta P}}^0 = -N^{-1}(0.25/df_L)\frac{\sigma_{25\Delta P}}{\sigma_0} + \frac{1}{2}\left(\sigma_0 - \frac{\sigma_{25\Delta P}^2}{\sigma_0}\right)\sqrt{t} \quad (42)$$

and the corrections $\zeta_{25\Delta C}$ and $\sigma_{25\Delta P}$ may be determined by subtracting the BS value for $\sigma_0$ from the values BS(25Δcall) and BS(25Δput), respectively, for example, as follows:

$$\zeta_{25\Delta C} = df_R F \left[ 0.25/df_L - \right. \tag{43}$$

$$N\left(N^{-1}(0.25/df_L) \cdot \frac{\sigma_{25\Delta c}}{\sigma_0} + \frac{1}{2}(\sigma_0 - \sigma_{25\Delta c}^2/\sigma_0)\sqrt{t}\right) -$$

$$-e^{-\left(N^{-1}(0.25/df_L)\sigma_{25\Delta c}\sqrt{t} - \frac{1}{2}\sigma_{25\Delta c}^2 t\right)} \cdot$$

$$\left. \left( \begin{array}{c} N(N^{-1}(0.25/df_L) - \sigma_{25\Delta C}^2 t) - \\ -N\left(N^{-1}(0.25/df_L)\frac{\sigma_{25\Delta C}}{\sigma_0} - \frac{1}{2}(\sigma_0 + \sigma_{25\Delta c}^2/\sigma_0)\sqrt{t}\right) \end{array} \right) \right]$$

$$\zeta_{25\Delta P} = df_R F \left[ -0.25/df_L + \right. \tag{44}$$

$$N\left(N^{-1}(0.25/df_L) \cdot \frac{\sigma_{25\Delta P}}{\sigma_0} - \frac{1}{2}(\sigma_0 - \sigma_{25\Delta p}^2/\sigma_0)\sqrt{t}\right) -$$

$$-e^{\left(N^{-1}(0.25/df_L)\sigma_{25\Delta P}\sqrt{t} + \frac{1}{2}\sigma_{25\Delta p}^2 t\right)} \cdot$$

$$\left. \left( \begin{array}{c} N(N^{-1}(0.25/df_L) + \sigma_{25\Delta P}^2 t) - \\ -N\left(N^{-1}(0.25/df_L)\frac{\sigma_{25\Delta P}}{\sigma_0} - \frac{1}{2}(\sigma_0 + \sigma_{25\Delta p}^2/\sigma_0)\sqrt{t}\right) \end{array} \right) \right]$$

The relationships of $\alpha_1(\beta_1)$ and $\alpha_2(\beta_2)$ may be determined, for example, based on Equations 19, 20, 21, 22, 43 and 44. One or more additional parameters of the functions $A(\Delta)$ and $B(\Delta)$ may be determined based on one or more additional parameters, e.g., the $\sigma_{10\ \Delta call}$ and/or $\sigma_{10\Delta put}$ parameters.

Following is an example, in accordance with some demonstrative embodiments, of a method of solving Equations 19 and 20, for example, by representing elements of equations 19 and 20 in terms of the notation $d_1$. However, it will be appreciated that in other embodiments Equations 19 and 20 may be solved in any other suitable manner, e.g., using any suitable representation, notation and/or any other solving method and/or algorithm.

In some demonstrative embodiments, Equations 19 and 20 may be rewritten as follows, for example, using the definition of Vega, e.g., according to Equation 10:

$$\zeta_C^\Delta + \zeta_P^\Delta = A(d_1) df_R F \sqrt{t}\, n(d_1) d_1^2 \left( \frac{1}{\sigma_{K_{Call}}} + \frac{1}{\sigma_{K_{Put}}} \right) \tag{45}$$

$$\zeta_C^\Delta - \zeta_P^\Delta = B(d_1) df_L n(d_1) d_1 \left( \frac{1}{\sigma_{K_{Call}}} + \frac{1}{\sigma_{K_{Put}}} \right) \tag{46}$$

wherein $A(d_1)$ and $B(d_1)$ denote first and second proportionality functions of $d_1$. The functions $A(d_1)$ and $B(d_1)$ may include one or more market-based parameters, which may be determined based on the market data, e.g., as described above.

In some demonstrative embodiments, a first combination of Equations 45 and 46, for example, a sum of Equations 45 and 46 may yield a first combined Equation, e.g., as follows:

$$\zeta_C^\Delta = \frac{1}{2}(A(d_1) df_R F \sqrt{t}\, d_1 + B(d_1) df_L) n(d_1) d_1 \left( \frac{1}{\sigma_{K_{Call}}} + \frac{1}{\sigma_{K_{Put}}} \right) \tag{47}$$

In some demonstrative embodiments, the volatility $\sigma_{K_{Call}}$ may be represented as a function of the notation $d_1$. For example, the following representation of the volatility $\sigma_{K_{Call}}$ may be achieved, for example, by rearranging Equation 26, e.g., since for a call option $K_C > K_0 = F e^{\sigma^+ t}$:

$$\sqrt{t}\, \sigma_{K_{Call}} = \sqrt{2\log\frac{K_{Call}}{F} + d_1^2} + d_1 \tag{48}$$

$$\frac{1}{\sqrt{t}\, \sigma_{K_{Call}}} = \frac{d_1 - \sqrt{2\log\frac{K_{Call}}{F} + d_1^2}}{2\log\frac{F}{K_{Call}}} \tag{49}$$

In some demonstrative embodiments, the volatility $\sigma_{K_{Put}}$ may be represented as a function of $\zeta_C$ and $d_1$. For example, the volatility $\sigma_{C_{Put}}$ may be represented as follows, e.g., by rearranging Equation 47 using Equations 48 and 49:

$$\frac{1}{\sigma_{K_{Put}}} = \frac{2\zeta_C^\Delta}{(A(d_1) df_R F \sqrt{t}\, d_1 + B(d_1) df_L) n(d_1) d_1} - \tag{50}$$

$$\frac{\sqrt{t}\left(d_1 - \sqrt{2\log\frac{K_{Call}}{F} + d_1^2}\right)}{2\log\frac{F}{K_{call}}}$$

$$\sigma_{K_{Put}} = \frac{2\log\frac{F}{K_{Call}}(A(d_1) df_R F \sqrt{t}\, d_1 + B(d_1) df_L) n(d_1) d_1}{4\log\frac{F}{K_{call}} \zeta_C^\Delta - (A(d_1) df_R F \sqrt{t}\, d_1 + B(d_1) df_L)} \tag{51}$$

$$n(d_1) d_1 \sqrt{t}\left(d_1 - \sqrt{2\log\frac{K_{Call}}{F} + d_1^2}\right)$$

In some demonstrative embodiments, a second combination of Equations 45 and 46 may yield a second combined Equation. For example, Equation 46 may be subtracted from Equation 45 and rearranged, e.g., as follows:

$$\zeta_C^\Delta = \tag{53}$$

$$\zeta_C^\Delta(K_{Call}, d_1, \sigma_0) = df_R N(d_1) - df_R K_{Call} N\left(-\sqrt{2\log\frac{K_{Call}}{F} + d_1^2}\right) -$$

$$-df_R N\left(\frac{\log\frac{F}{K_{Call}}}{\sigma_0 \sqrt{t}} + \frac{1}{2}\sigma_0^2 \sqrt{t}\right) +$$

$$df_R K_{Call} N\left(\frac{\log\frac{F}{K_{Call}}}{\sigma_0 \sqrt{t}} - \frac{1}{2}\sigma_0 \sqrt{t}\right)$$

$$\zeta_P^\Delta = \zeta_P^\Delta(K_{Call}, d_1, \sigma_0) = \tag{54}$$

$$df_R F\left(e^{\left(d_1 \sqrt{t}\, \sigma_{K_{Putt}} + \frac{1}{2}\sigma_{K_{Putt}}^2 t\right)} N(d_1 + \sigma_{K_{Put}} \sqrt{t}) - N(d_1)\right) -$$

$$-df_R F\left(e^{\left(d_1 \sqrt{t}\, \sigma_{K_{Putt}} + \frac{1}{2}\sigma_{K_{Putt}}^2 t\right)} N\left(\frac{2d_1 \sqrt{t}\, \sigma_{K_{Putt}} + \sigma_{K_{Putt}}^2 t}{2\sigma_0 \sqrt{t}} + \frac{\sigma_0 \sqrt{t}}{2}\right) - \right.$$

$$\left. N\left(\frac{2d_1 \sqrt{t}\, \sigma_{K_{Putt}} + \sigma_{K_{Putt}}^2 t}{2\sigma_0 \sqrt{t}} - \frac{\sigma_0 \sqrt{t}}{2}\right)\right)$$

In some demonstrative embodiments, the corrections $\zeta_C^\Delta$ and/or $\zeta_P^\Delta$ may be represented as a function of $d_1$, K and $\sigma_0$. For example, the corrections $\zeta_C^\Delta$ and/or $\zeta_P^\Delta$ may be represented as follows, e.g., by combining and rearranging Equations 4, 5, 17, 18, 25, 48 and/or 49:

$$\zeta_P^\Delta = (A(d_1)df_R F\sqrt{t}\,d_1 - B(d_1)df_L)n(d_1)d_1\left(\frac{1}{\sigma_{K_{Call}}} + \frac{1}{\sigma_{K_{Put}}}\right) \quad (52)$$

wherein, for example, the volatility $\sigma_{K_{Put}}$ may be replaced according to Equation 51.

In some demonstrative embodiments, the value of $d_1$ may be determined, e.g., using any suitable numeric method, for example, by requiring that Equation 52 is equal to Equation 54, e.g., as described below.

In some demonstrative embodiments, a method of determining the value of $d_1$ may include selecting an initial value for $d_1$.

In some demonstrative embodiments, the method of determining the value of $d_1$ may include determining the value of the correction $\zeta_C^\Delta$ using the value of $d_1$, e.g., according to Equation 53.

In some demonstrative embodiments, the method of determining the value of $d_1$ may include determining the value of the volatility $\sigma_{K_{Put}}$ may using the value of $d_1$ and the determined correction $\zeta_C^\Delta$, e.g., according to Equation 51.

In some demonstrative embodiments, the method of determining the value of $d_1$ may include determining the value of the correction $\zeta_P^\Delta$ using the value of $d_1$ and the determined volatility $\sigma_{K_{Put}}$, e.g., according to Equation 54.

In some demonstrative embodiments, the method of determining the value of $d_1$ may include substituting the determined value of the correction $\zeta_P^\Delta$ into Equation 52 and determining whether or not the determined value of the correction $\zeta_P^\Delta$ satisfies Equation 52.

In some demonstrative embodiments, if, for example, the determined value of the correction $\zeta_P^\Delta$ does not satisfy Equation 52, then another value of $d_1$ may be selected and the determining of the value of the correction $\zeta_C^\Delta$, determining the value of the volatility $\sigma_{K_{Put}}$, determining the value of the correction $\zeta_P^\Delta$ and determining whether or not the determined value of the correction $\zeta_P^\Delta$ satisfies Equation 52 may be repeated iteratively, e.g., until Equation 52 is satisfied. The value of $d_1$ may be selected according to any suitable solver algorithm.

In some demonstrative embodiments, the method of determining the value of $d_1$ may be performed using any suitable solver, for example, a solver including bisection for convergence and/or stability. In one embodiment, the solver may include a Newton-Raphson solver. In other embodiments, the solver may include any other suitable solver type, e.g., a Brent solver and the like.

In some demonstrative embodiments, Equations 17 and/or 18 may be simplified using any suitable approximation, e.g., in order to allow solving of Equations 23 and/or 24 in a more efficient and/or quicker manner. In one example, Equations 17 and/or 18 may be rewritten using the format of a Taylor-series approximation, e.g., as follows:

$$\zeta_C(\sigma_{K_{Call}}, K_{Call}) = (\sigma_{K_{Call}} - \sigma_0)df_L \cdot \quad (55)$$
$$S\sqrt{t} \cdot N(d_1) \cdot \left(1 + (\sigma_{K_{Call}} - \sigma_0)\frac{d_1}{2}\left(\frac{d_1}{\sigma_{K_{Call}}} - \sqrt{t}\right)\right)$$

$$\zeta_P(\sigma_{K_{Put}}, K_{Put}) = \quad (56)$$
$$(\sigma_{K_{Put}} - \sigma_0)df_L \cdot S\sqrt{t} \cdot N(d_1) \cdot \left(1 + (\sigma_{K_{Put}} - \sigma_0)\frac{d_1}{2}\left(\frac{d_1}{\sigma_{K_{Put}}} + \sqrt{t}\right)\right)$$

In some demonstrative embodiments, pricing module 160 may receive from user 102, e.g., via interface 110, first input data including one or more parameters defining an option to be priced ("the requested option").

In some demonstrative embodiments, pricing module 160 may receive, e.g., from market data service 149, second input data corresponding to at least one current market condition relating to an underlying asset of the option, e.g., including real time market data corresponding to an asset class of the requested option.

For example, for FX instruments, pricing module 160 may receive from market data service 149 market data including one or more of spot rates, forward rates, interest rates, at the money volatility for different maturities, 25 delta risk reversals for different maturities, 25 delta butterflies for different maturities and, optionally, other delta risk reversals and/or butterflies, e.g., the 10 delta risk reversal and/or the 10 delta butterfly.

For interest-rate instruments, pricing module 160 may receive from market data service 149 market data including one or more of Libor rates, e.g., all Libor rates in all available countries, swap rates for all maturities, interest-rates future prices in currencies, where available, cap floor volatilities or prices for several strikes, swaption at the money volatilities and other strikes such as 100 or 200 basis points over and under the at the money forward strike.

For equity options pricing module 160 may receive from market data service 149 market data including exchange prices for stocks and indices, exchange prices for options on stocks and indices, forward prices for several maturities, and/or security lending rates and interest rates, and the like.

In some demonstrative embodiments, pricing module 160 may determine the functions $A(\Delta)$ and/or $B(\Delta)$, for example, based on the received market data, e.g., using Equations 31-34, as described above.

In some demonstrative embodiments, pricing module 160 may determine the volatility smile corresponding to the option. For example, pricing module may determine one or more volatilities $\sigma_k$ corresponding to a Vanilla option having one or more respective strikes K, for example, based on Equations 23 and/or 27, e.g., depending on the whether the option is a call option or a put option.

In some demonstrative embodiments, pricing module 160 may perform any suitable extrapolation and/or interpolation operations to determine a volatility surface and/or the volatility corresponding to the strike and expiration time of the requested option, e.g., based on the determined volatilities $\sigma_k$.

In some demonstrative embodiments, pricing module 160 may determine the correction $\zeta$ to be added to the BS value of the Vanilla option in accordance with the volatility smile, for example, according to Equations 23 and/or 27, e.g., depending on the whether the option is a call option or a put option.

In some demonstrative embodiments, pricing module 160 may determine the price of the Vanilla option based on the correction $\zeta$ and the BS value of the Vanilla option, e.g., according to Equation 16.

In some demonstrative embodiments, pricing module 160 may determine the price of the requested option, e.g., based on the determined price of the corresponding Vanilla option.

In some demonstrative embodiments, interface 110 and pricing module 160 may be implemented as part of an application or application server to process user information, e.g., including details of a defined option to be priced, received from user 102, as well as real time trade information, received, for example, from market data service 149. System 100 may also include storage 161, e.g., a database, for storing the user information and/or the trade information.

The user information may be received from user 102, for example, via a communication network, for example, the Internet, e.g., using a direct telephone connection or a Secure Socket Layer (SSL) connection, a Local Area Network (LAN), or via any other communication network known in the art. Pricing module 160 may communicate a determined price corresponding to the defined option to user 102 via interface 110, e.g., in a format convenient for presentation to user 102.

A system, e.g., system 100, for pricing financial derivatives according to some embodiments, may provide price information for substantially any suitable option on substantially any suitable asset based on input market data. The market data may be easily obtained, e.g., by pricing module 160, on a real time basis. Thus, pricing module 160 may provide user 102 with a real-time price of any desired option, e.g., based on real time prices received from the exchanges and/or OTC market. Pricing module 160 may update the price, e.g., substantially immediately and/or automatically, for example, in response to a change in spot prices and/or option prices. This may enable user 102 to automatically update prices for trading with the exchanges.

A trader may want, for example, to submit a plurality of bid and/or offer (hereinafter "bid/offer") prices for a plurality of options, e.g., ten bid/offer prices for ten options, respectively. When entering the bids/offers to a quoting system, the trader may check the price, e.g., in relation to the current spot prices, and may then submit the bids/offers to the exchange. Some time later, e.g., a second later, the spot price of the stock which is the underlying asset of one or more of the options may change. A change in the spot prices may be accompanied, for example, by changes in the volatility parameters, or may include just a small spot change while the volatility parameters have not changed. In response to the change in the spot price, the trader may want to update one or more of the submitted bid/offer prices. The desire to update the bid/offer prices may occur, e.g., frequently, during trade time.

A system according to some demonstrative embodiments, e.g., system 100, may automatically update the bid/offer prices entered by the trader, e.g., based on any desired criteria. For example, pricing module 160 may evaluate the trader's bids/offers versus bid and offer prices of the options, which may be estimated by pricing module 160, e.g., when the trader submits the bid/offer prices. Pricing module 160 may then automatically recalculate the bid and/or offer prices, e.g., whenever the spot changes, and may automatically update the trader's bid/offer prices. Pricing module 160 may, for example, update one or more of the trader's bid/offer prices such that a price difference between the bid/offer price calculated by pricing module 160 and the trader's bid/offer price is kept substantially constant. According to another example, pricing module 160 may update one or more of the trader's bid/offer prices based on a difference between the trader's bid/offer prices and an average of bid and offer prices calculated by pricing module 160. Pricing module 160 may update one or more of the trader's bid/offer prices based on any other desired criteria.

It is noted, that a change of the spot price, e.g., of a few pips, may result in a change in one or more of the volatility parameters of options corresponding to the spot price. It will be appreciated that a pricing module according to some embodiments, e.g., pricing module 160, may enable automatically updating one or more option prices submitted by a trader, e.g., while taking into account the change in the spot price, in one or more of the volatility parameters, and/or in any other desired parameters, as described above.

According to some demonstrative embodiments, pricing module 160 may enable the trader to submit one or more quotes in the exchange in a form of relative prices vs. prices determined by the pricing module 160. For example, the trader may submit quotes for one or more desired strikes and/or expiry dates. The quotes submitted by the trader may be in any desired form, e.g., relating to one or more corresponding prices determined by pricing module 160. For example, the quotes submitted by the trader may be in the terms of the bid/offer prices determined by pricing module 160 plus two basis points; in the terms of the mid market price determined by pricing module 160 minus four basis points, and/or in any other suitable format and/or terms. Pricing module 160 may determine the desired prices, for example, in real time, e.g., whenever a price change in the exchange is recorded. Alternatively, pricing module 160 may determine the desired prices, according to any other desired timing scheme, for example, every predefined time interval, e.g., every half a second.

A change in a spot price of a stock may result in changes in the prices of a large number of options related to the stock. For example there could be over 200 active options relating to a single stock and having different strikes and expiration dates. Accordingly, a massive bandwidth may be required by traders for updating the exchange prices of the options in accordance with the spot price changes, e.g., in real time. This may lead the traders to submit to the exchange prices which may be "non-competitive", e.g., prices including a "safety-margin", since the traders may not be able to update the submitted prices according to the rate at which the spot prices, the volatility, the dividend, and/or the carry rate may change.

According to some demonstrative embodiments, pricing module 160 may be implemented, e.g., by the exchange or by traders, for example, to automatically update one or more bid and/or offer prices submitted by a trader, e.g., as described above. This may encourage the traders to submit with the exchange more aggressive bid and/or offer prices, since the traders may no longer need to add the "safety margin" their prices for protecting the traders against the frequent changes in the spot prices. Accordingly, the trading in the exchange may be more effective, resulting in a larger number of transactions. For example, a trader may provide pricing system 100 with one or more desired volatility parameter and/or rates. The trader may request system 100 to automatically submit and/or update bid and/or offer prices on desired amounts of options, e.g., whenever there is a significant change in the spot price and/or in the volatility of the market. The trader may also update some or all of the volatility parameters. In addition, system 100 may be linked, for example, to an automatic decision making system, which may be able to decide when to buy and/or sell options using pricing module 160.

Figure 2:
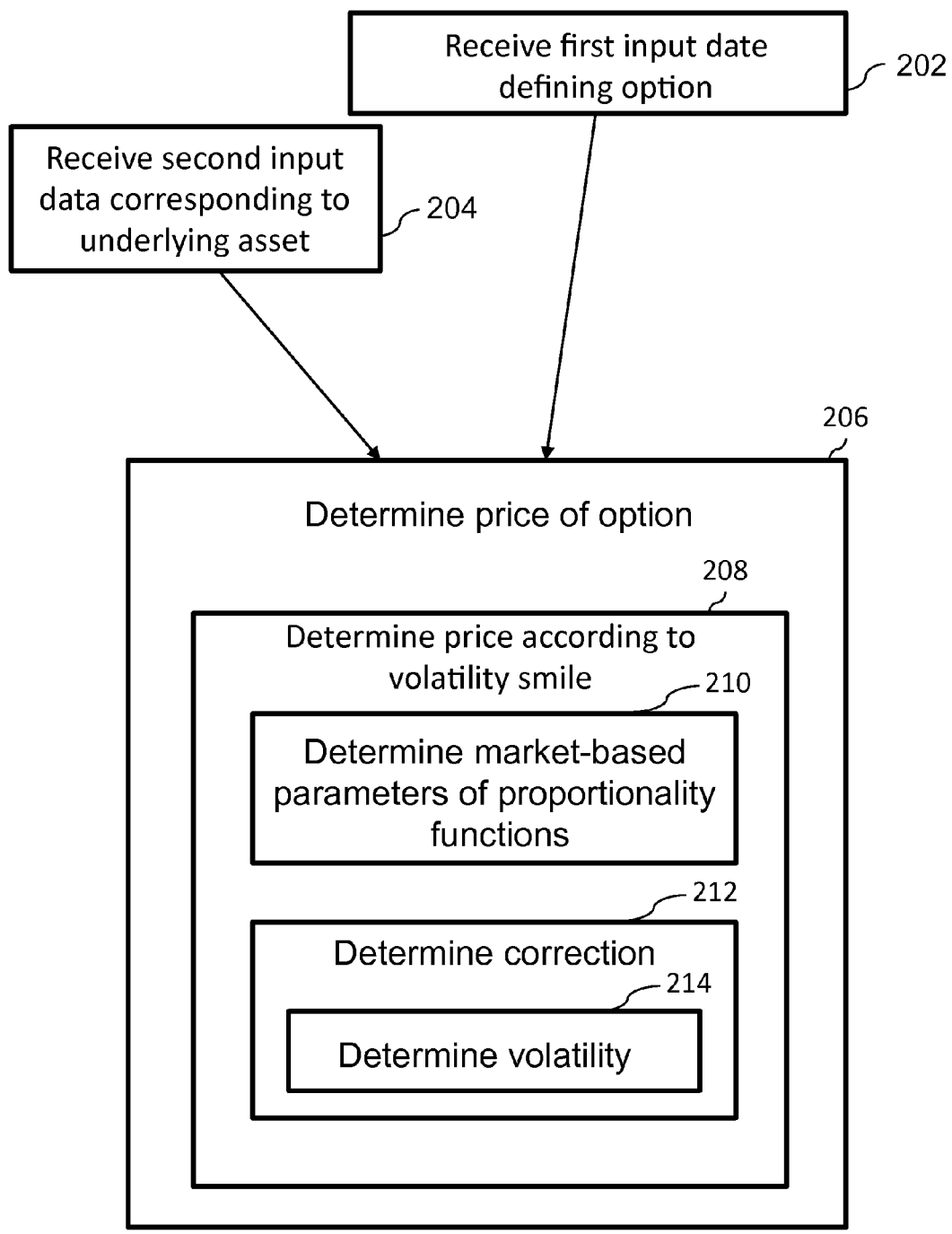
FIG. 2 is a schematic flow-chart illustration of a method, in accordance with some demonstrative embodiments.

Reference is made to FIG. 2, which schematically illustrates a method of pricing an option in accordance with some demonstrative embodiments. In some demonstrative embodiments, one or more of the operations of the method of FIG. 2 may be performed and/or implemented by any suitable device and/or system, for example, suitable computing device and/or system, e.g., system 100 (FIG. 1) and/or pricing module 160 (FIG. 1).

As indicated at block 202, the method may include receiving first input data corresponding to at least one parameter defining a first option on an underlying asset. For example, module 160 (FIG. 1) may receive e.g., from user 102 (FIG. 1), the first input data defining an option to be priced, e.g., as described above.

As indicated at block 204, the method may include receiving second input data corresponding to at least one current market condition relating to the underlying asset. For example, module 160 (FIG. 1) may receive e.g., from services 149 (FIG. 1), the second input data corresponding to the underlying asset, e.g., as described above.

As indicated at block 206, the method may include determining a price of the first option based on the first and second input data, according to a volatility smile satisfying one or more predefined criterions.

As indicated at block 208, determining the price of the first option may include determining the price of the first option according to a volatility smile satisfying a first criterion relating to a sum of a first correction corresponding to the first option and a second correction corresponding to a second option representing a position opposite to a position of a the first option and having a same delta as the first option.

In some demonstrative embodiments, the first correction may relate to a difference between a theoretical price of the first option and the price of the first option according to the volatility smile, and/or the second correction may relate to a difference between a theoretical price of the second option and the price of the second option according to the volatility smile. For example, module 160 (FIG. 1) may determine the price of the first option according to a volatility smile satisfying Equations 19 and 20, e.g., as described above.

As indicated at block 210, determining the price of the first option according to the volatility smile may include determining market-based parameters of first and second proportionality functions based on the second input data. For example, module 160 (FIG. 1) may determine the market-based parameters of the proportionality functions $A(\Delta)$ and $B(\Delta)$ based on the market data, e.g., as described above.

As indicated at block 212, determining the price of the first option according to the volatility smile may include determining the first correction based on the first and second criterions. For example, module 160 (FIG. 1) may determine the correction $\zeta$ corresponding to the first option according to Equations 23 and/or 27, e.g., as described above.

As indicated at block 214 determining the first correction may include determining a volatility of the first option based on the first and second criterions, and determining the first correction based on the volatility of the first option. For example, module 160 (FIG. 1) may determine the volatility $\sigma$ corresponding to the first option, and the correction $\zeta$ corresponding to the volatility $\sigma$, e.g., as described above.

Following are examples of volatility smiles determined with respect to options on various asset classes, using the volatility smile mode as described herein in accordance with some demonstrative embodiments. It should be noted that the trade information used in these examples have been randomly selected from the market for demonstrative purposes only and is not intended to limit the scope of the embodiments described herein to any particular choice of the trade information.

The volatility smiles were determined using the following proportionality functions:

$$A(\Delta)=c_{1_e}{}^{-c_2(\Delta_0-\Delta)} \quad (57)$$

$$B(\Delta)=c_1{}'_e{}^{-c_2{}'(\Delta_0-\Delta)} \quad (58)$$

wherein $c_1$, $c_1{}'$, $c_2$, $c_2{}'$ denote four respective market parameters to be determined, e.g., based on the traded market data.

The following examples demonstrate the results of the volatility smile model with respect to different asset classes, e.g., at the same time. The following examples relate to options on currencies, e.g., options on the exchange rate of EURO (EUR) to US dollar (USD) (EUR/USD), which are traded in the OTC market; options on Interest Rates, e.g., swaptions on EUR swap rates, which are traded in the OTC market; options on Commodities, e.g., options on West Texas intermediate (WTI) crude oil, which is exchange traded; and options on Equities, e.g., options on the DAX index, which is exchange traded. All of the examples relate to assets, which are very liquid and commonly traded, therefore the market data may be assumed to be accurate. The examples relate to different maturities. The following examples are based on market data on Dec. 27, 2010.

A first example relates to FX options on EUR/USD with an expiration of one year. The FX options market trades ATM delta neutral volatility as well as delta strikes. The inputs received from the market are summarized in Table 1:

Delta neutral ATM vol $\sigma_0$=14.45; Forward rate=1.31408

TABLE 1

| | Delta | | | | | | |
|---|---|---|---|---|---|---|---|
| | 5 Δ Put | 10 Δ Put | 25 Δ Put | ATM | 25 Δ Call | 10 Δ Call | 5 Δ Call |
| Strike | 0.951 | 1.053 | 1.1956 | 1.3279 | 1.4541 | 1.5933 | 1.7016 |
| Market Vol | 21.19 | 18.775 | 16.225 | 14.45 | 13.825 | 14.325 | 15.08 |

Based on the above market data, the market-based parameters may be determined as follows, e.g., using the model described above: c1=0.002, c2=0.5, c1'=0.0042, c2'=1.6.

A volatility smile ("the model volatility smile") corresponding to the FX options may be determined according to Equations 19 and 20, e.g., as described above. Table 2 includes seven volatilities corresponding to seven respective strikes determined according to the volatility smile:

TABLE 2

| Strike | 0.9423 | 1.0562 | 1.1941 | 1.3279 | 1.4541 | 1.5933 | 1.7016 |
|---|---|---|---|---|---|---|---|
| Model Vol | 21.638 | 18.533 | 16.288 | 14.450 | 13.723 | 14.343 | 15.023 |

Figure 3H:
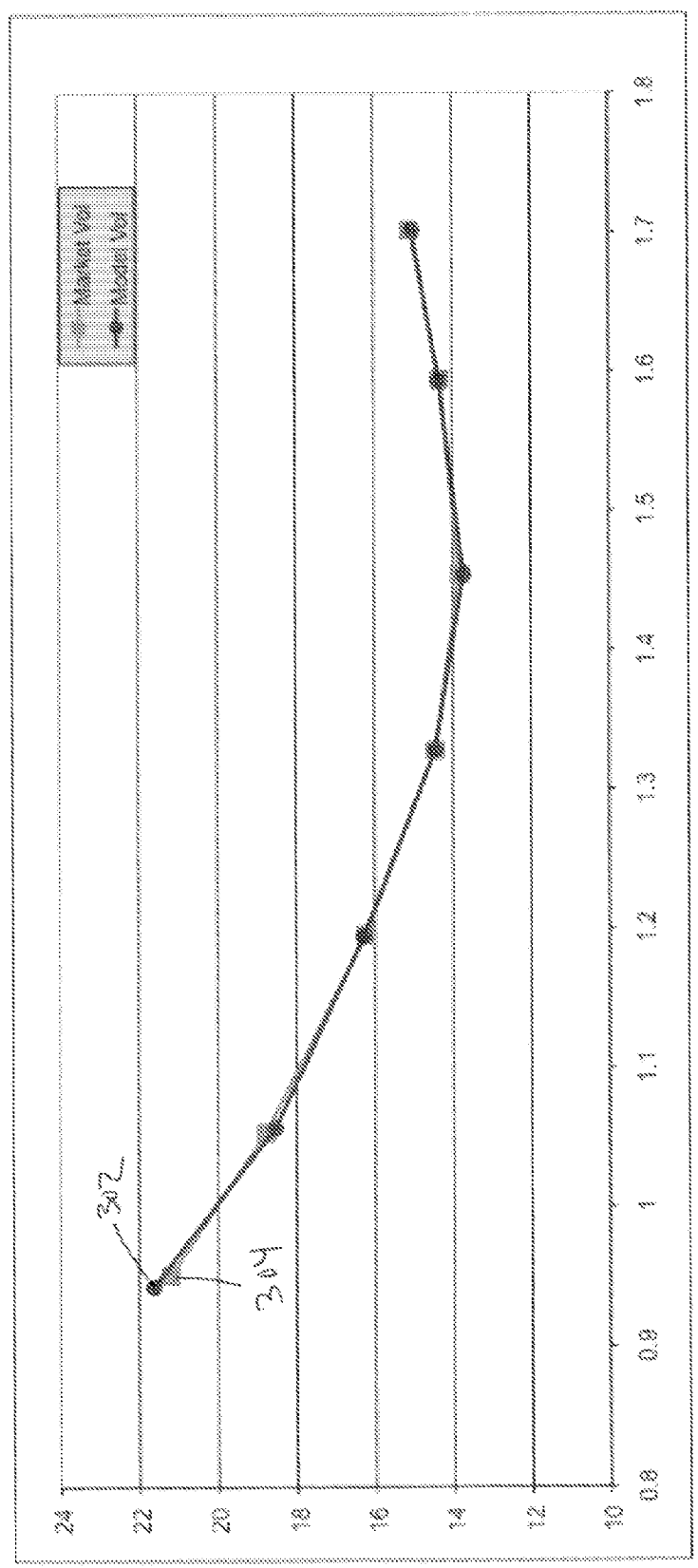
FIGS. 3A-3D are schematic illustrations of graphs depicting volatility smiles, in accordance with some demonstrative embodiments.

FIG. 3A schematically illustrates a first graph 302 depicting the model volatility smile based on Table 2, and a second graph 304 depicting the market volatilities of Table 1. As shown in FIG. 3A, the differences between the model volatility smile and the market volatilities are generally negligible.

A second example relates to options on EUR swaps rate with a maturity of ten years and an expiration of one year. The interest-rates market trades ATM forward strikes (ATMF, where the strike is the forward rate) and other strikes may be measured with respect to a difference in basis points from the forward rate. The inputs received from the market are summarized in Table 3:

Forward=3.671

TABLE 3

| | Market Data | | | | | | | |
|---|---|---|---|---|---|---|---|---|
| Strike | -100 | -50 | -25 | ATMF | +25 | +50 | +100 | +200 |
| | 2.671 | 3.171 | 3.421 | 3.671 | 3.921 | 4.171 | 4.671 | 5.671 |
| Market Vol | 31.3 | 27.7 | 26.3 | 25.1 | 24 | 23.2 | 22.2 | 21.9 |

Based on the above market data, the market-based parameters may be determined as follows, e.g., using the model described above: $\sigma_0$=24.5, c1=0.0045, c2=1.5, c1'=0.0095, c2'=0.1.

The model volatility smile corresponding to the IR options may be determined according to Equations 19 and 20, e.g., as described above. Table 4 includes volatilities corresponding to respective strikes determined according to the volatility smile:

TABLE 4

| Strike | 2.644177 | 2.874236 | 3.12931 | 3.387316 | 3.643633 | 3.921 |
|---|---|---|---|---|---|---|
| Model Vol | 31.21694 | 29.41119 | 27.83829 | 26.42833 | 25.13876 | 23.94235 |
| Strike | 4.171 | 4.421 | 4.671 | 4.9 | 5.671 | |
| Model Vol | 23.12829 | 22.52502 | 22.11125 | 21.88758 | 21.9418 | |

Figure 3B:
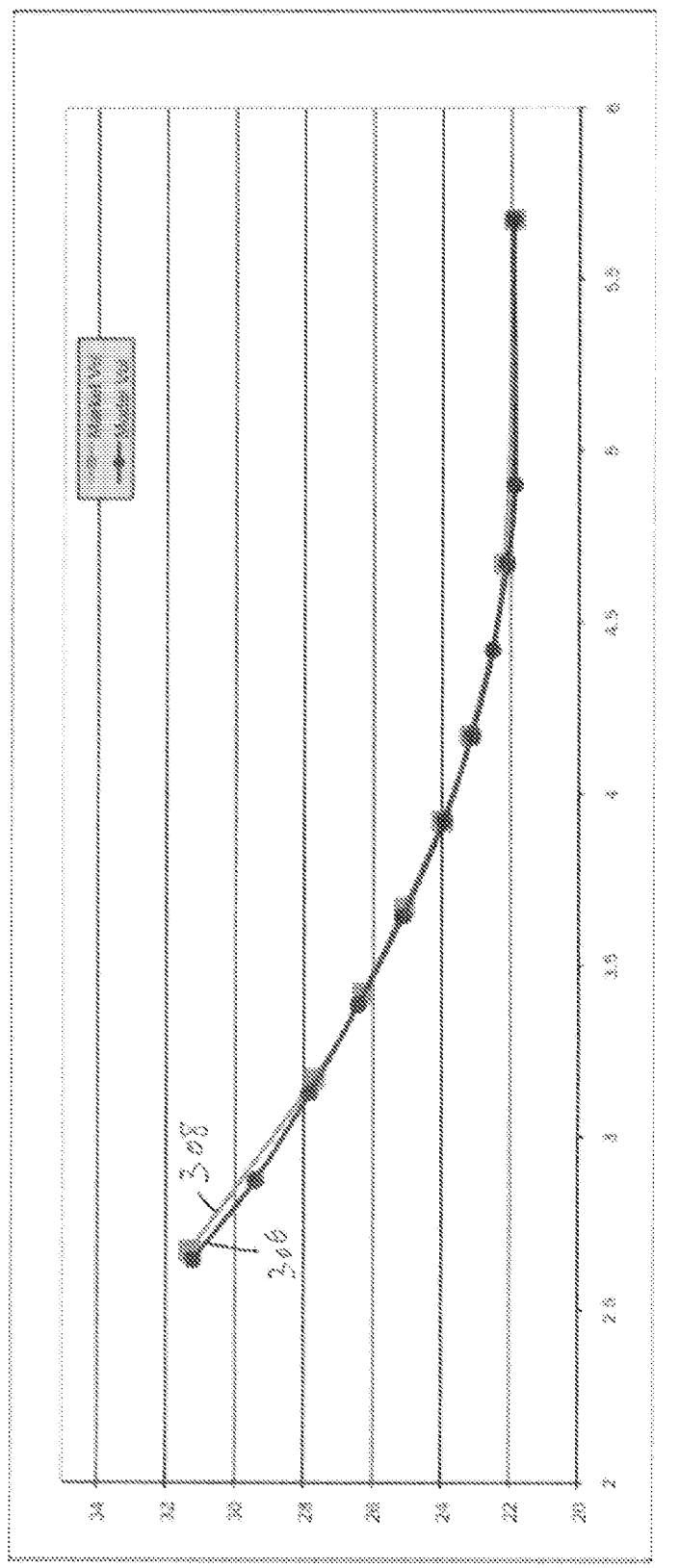

FIG. 3B schematically illustrates a first graph 306 depicting the model volatility smile based on Table 4 and a second graph 308 depicting the market volatilities of Table 3. As shown in FIG. 3B, the differences between the model volatility smile and the market volatilities are generally negligible.

A third example relates to options on WTI crude oil with expiration on Nov. 15, 2012 (687 days). The underlying asset of these options is the WTI future contract of December12 (December 2012). The market data is taken from the Nymex exchange (CME), and includes about 20 strikes with their corresponding volatility implied from the exchange price for option premium. The inputs received from the market are summarized in Table 5:

Forward=92.61

Figure 3C:
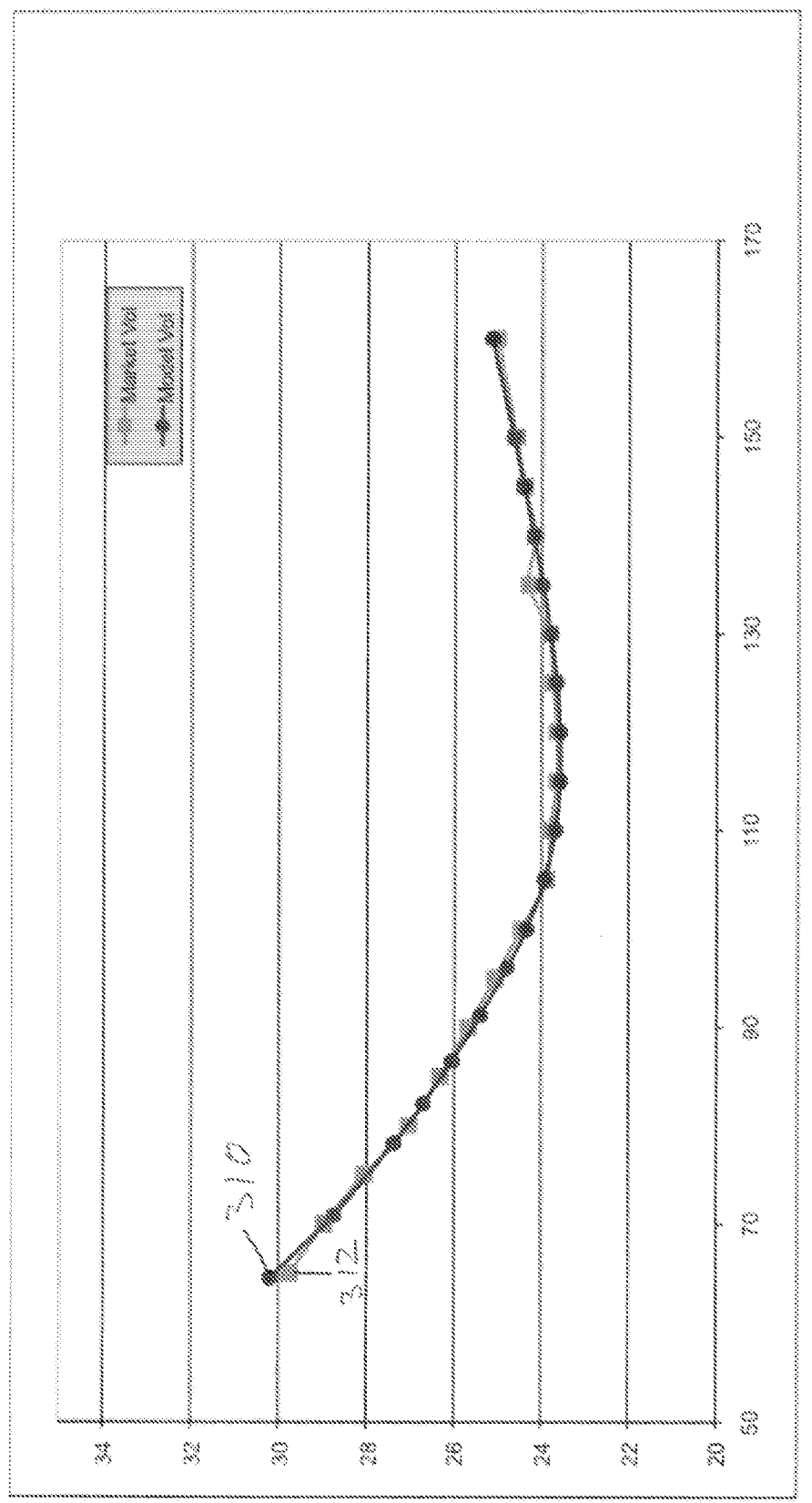

FIG. 3C schematically illustrates a first graph 310 depicting the model volatility smile based on Table 6 and a second graph 312 depicting the market volatilities of Table 5. As shown in FIG. 3C, the differences between the model volatility smile and the market volatilities are generally negligible.

A fourth example relates to options on the DAX index with expiration on Dec. 21, 2012 (725 calendar days). The market volatilities are taken from the exchange settlement prices for the expiry date of Dec. 21, 2012. The inputs received from the market are summarized in Table 7:

Forward=7187.635

TABLE 5

| Strike | 65 | 70 | 75 | 80 | 85 | 90 | 95 | 100 | 105 | 110 |
|---|---|---|---|---|---|---|---|---|---|---|
| Market Vol | 29.75 | 28.97 | 28.06 | 27.04 | 26.32 | 25.68 | 25.07 | 24.47 | 23.89 | 23.8 |
| Strike | 115 | 120 | 125 | 130 | 135 | 140 | 145 | 150 | 160 | |
| Market Vol | 23.65 | 23.65 | 23.74 | 23.83 | 24.3 | 24.16 | 24.4 | 24.6 | 25.02 | |

Based on the above market data, the market-based parameters may be determined as follows, e.g., using the model described above: $\sigma_0$=24.491, c1=0.0105, c2=0.015, c1'=0.0165, c2'=0.65.

The model volatility smile corresponding to the WTI options may be determined according to Equations 19 and 20, e.g., as described above. Table 6 includes volatilities corresponding to respective strikes determined according to the volatility smile:

TABLE 6

| Strike | 64.52 | 70.87 | 78.17 | 82.23 | 86.58 | 91.21 | 96.05 | 100.00 | 105.00 | 110.00 |
|---|---|---|---|---|---|---|---|---|---|---|
| Model Vol | 30.20 | 28.76 | 27.38 | 26.71 | 26.05 | 25.40 | 24.79 | 24.35 | 23.94 | 23.69 |
| Strike | 115 | 120 | 125 | 130 | 135 | 140 | 145 | 150 | 160 | |
| Model Vol | 23.58 | 23.58 | 23.66 | 23.80 | 23.98 | 24.19 | 24.41 | 24.65 | 25.15 | |

TABLE 7

| Strike | 4200 | 4600 | 5000 | 5400 | 5800 | 6200 | 6600 | 7000 | 7400 |
|---|---|---|---|---|---|---|---|---|---|
| Market Vol | 33.16 | 31.62 | 30.14 | 28.72 | 27.33 | 25.95 | 24.60 | 23.30 | 22.11 |
| Strike | 7600 | 8000 | 8400 | 8800 | 9200 | 9600 | 10000 | 10400 | 11000 |
| Market Vol | 21.57 | 20.61 | 19.82 | 19.19 | 18.65 | 18.16 | 17.72 | 17.32 | 17.02 |

Based on the above market data, the market-based parameters may be determined as follows, e.g., using the model described above: $\sigma_0=22.00$, $c1=0.005$, $c2=0.2$, $c1'=0.025$, $c2'=0.1$.

The model volatility smile corresponding to the DAX options may be determined according to Equations 19 and 20, e.g., as described above. Table 8 includes volatilities corresponding to respective strikes determined according to the volatility smile:

TABLE 8

| Strike | 4238.85 | 4693.35 | 5159.1 | 5639.83 | 6127.86 | 6606.64 | 7060.75 | 7482.51 | 7600 |
|---|---|---|---|---|---|---|---|---|---|
| Model Vol | 33.79 | 31.31 | 29.26 | 27.50 | 25.94 | 24.54 | 23.29 | 22.15 | 21.84 |
| Strike | 8000 | 8400 | 8800 | 9200 | 9600 | 10000 | 10400 | 11000 | |
| Model Vol | 20.81 | 19.87 | 19.06 | 18.45 | 18.05 | 17.85 | 17.80 | 17.89 | |

Figure 3D:
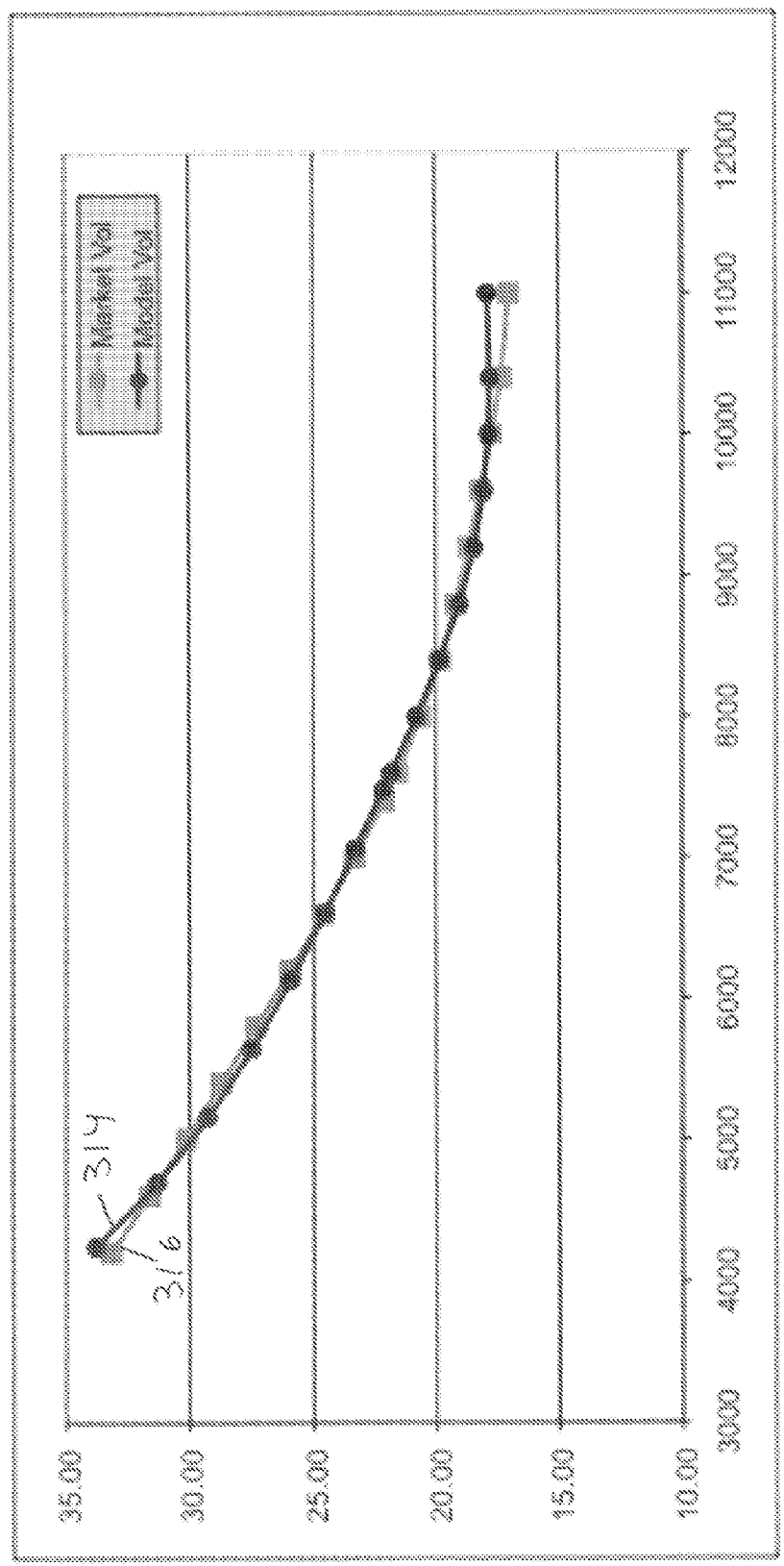

FIG. 3D schematically illustrates a first graph 314 depicting the model volatility smile based on Table 8 and a second graph 316 depicting the market volatilities of Table 7. As shown in FIG. 3D, the differences between the model volatility smile and the market volatilities are generally negligible.

Figure 4:
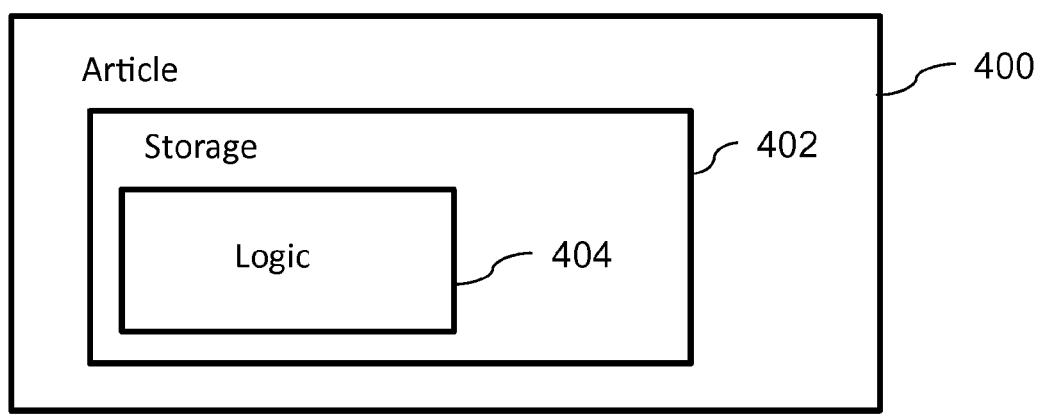
FIG. 4 is schematic illustration of an article of manufacture, in accordance with some demonstrative embodiments.

Reference is made to FIG. 4, which schematically illustrates an article of manufacture 400, in accordance with some demonstrative embodiments. Article 400 may include a machine-readable storage medium 402 to store logic 404, which may be used, for example, to perform at least part of the functionality of pricing module 160 (FIG. 1); and/or to perform one or more operations described herein.

In some demonstrative embodiments, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, some embodiments are not described with reference to any particular programming language. It will be appreciated that a variety of programming languages may be used to implement the teachings of the invention as described herein.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A system of pricing options, the system comprising:
a computing device configured to:
receive first input data corresponding to at least one parameter defining a first option on an underlying asset;
receive second input data corresponding to at least one current market condition relating to said underlying asset; and
determine, based on said first and second input data, a price of the first option according to a pricing model,
wherein the price of the first option according to the pricing model satisfies a first criterion and a second criterion, the first criterion relates to a sum of a first correction corresponding to the first option and a second correction corresponding to a second option, the second criterion relates to a difference between the first correction corresponding to the first option and the second correction corresponding to the second option,
wherein the second option represents a position opposite to a position of the first option and has a same absolute delta value as the first option,
wherein the first correction relates to a difference between the price of the first option according to the pricing model and a price of the first option according to a Black-Scholes model with an At-The-Money (ATM) volatility,
and wherein the second correction relates to a difference between the price of the second option according to the pricing model and a price of the second option according to the Black-Scholes model with the ATM volatility.

2. The system of claim 1, wherein the first criterion requires that the sum of the first and second corrections is proportional to a sum of first and second volatility convexities corresponding to the first and second options,
and wherein the second criterion requires that a difference between the first and second corrections is proportional to a difference between first and second delta convexities corresponding to the first and second options.

3. The system of claim 2, wherein the first criterion requires that the sum of the first and second corrections is proportional to the sum of the first and second volatility convexities according to a first proportionality function, which is based on said delta,
and wherein the second criterion requires that the difference between the first and second corrections is proportional to the difference between the first and second delta convexities according to a second proportionality function, which is based on said delta.

4. The system of claim 3, wherein at least one of the first and second proportionality functions includes a predefined combination of said delta and one or more market-based parameters, and wherein said computing device is to determine said market-based parameters based on said second input data.

5. The system of claim 4, wherein the first and second proportionality functions are decreasing functions of said delta.

6. The system of claim 1, wherein the first and second criteria require satisfying the following equations:

$$\zeta_C^\Delta + \zeta_P^\Delta = A(\Delta) \cdot Vega^\Delta d_1^2 \left( \frac{1}{\sigma_{K_{Call}}} + \frac{1}{\sigma_{K_{Put}}} \right)$$

$$\zeta_C^\Delta - \zeta_P^\Delta = B(\Delta) \cdot Vega^\Delta \frac{d}{S\sqrt{t}} \left( \frac{1}{\sigma_{K_{Call}}} + \frac{1}{\sigma_{K_{Put}}} \right)$$

wherein $\zeta_C^\Delta$ and $\zeta_P^\Delta$ denote said first and second corrections,
wherein $\Delta$ denotes said delta,
wherein $A(\Delta)$ and $B(\Delta)$ denote first and second functions of $\Delta$, respectively,
wherein $Vega^\Delta$ denotes a vega of the first and second options,
wherein t denotes a time to expiration of said first option,
wherein $d_1$ denotes a predefined function of the time to expiration of said first option,
wherein S denotes a price of said underlying asset,
and wherein $\sigma_{K_{Call}}$ and $\sigma_{K_{Put}}$ denote a volatility of the first option and a volatility of the second option, respectively.

7. The system of claim 1, wherein said first and second options include Vanilla options.

8. The system of claim 7, wherein said computing device is to determine a price of an exotic option on said underlying asset based on the price of said first option according to the pricing model.

9. The system of claim 1, wherein said first input data comprises an indication of at least one parameter selected from the group consisting of a type of said first option, an expiration date of said first option, a trigger for said first option, and a strike of said first option.

10. The system of claim 1, wherein said second input data comprises an indication of at least one parameter selected from the group consisting of a spot value, a forward rate, an interest rate, a volatility, an at-the-money volatility, a delta risk reversal, a delta butterfly, a delta strangle, a 10 delta risk reversal, a 10 delta butterfly, a 10 delta strangle, a 25 delta risk reversal, a 25 delta butterfly, a 25 delta strangle, a caplet, a floorlet, a swap rate, a security lending rate, and an exchange price.

11. The system of claim 1, wherein said computing device is to provide an output based on the price of the first option.

12. The system of claim 11, wherein said computing device is to communicate said output via a communication network.

13. The system of claim 1, wherein said underlying asset comprises a financial asset.

14. The system of claim 1, wherein said underlying asset is related to at least one asset type selected from the group consisting of a commodity, a stock, a bond, a currency, an interest rate, and the weather.

15. A computer-based method of pricing options, the method comprising:
receiving, by a computing device, first input data corresponding to at least one parameter defining an option to be priced on an underlying asset;
receiving, by the computing device, second input data corresponding to at least one current market condition relating to said underlying asset; and
determining by the computing device, based on said first and second input data, a price of the option according to a pricing model,
wherein the price of a first option according to the pricing model satisfies a first criterion and a second criterion, the first criterion relates to a sum of a first correction corresponding to the first option and a second correction corresponding to a second option, the second criterion relates to a difference between the first correction corresponding to the first option and the second correction corresponding to the second option, wherein the second option represents a position opposite to a position of the first option and has a same absolute delta value as the first option, wherein the first correction relates to a difference between the price of the first option according to the pricing model and a price of the first option according to a Black-Scholes model with an At-The-Money (ATM) volatility, and wherein the second correction relates to a difference between the price of the second option according to the pricing model and a price of the second option according to the Black-Scholes model with the ATM volatility.

16. The method of claim 15, wherein the first criterion requires that the sum of the first and second corrections is proportional to a sum of first and second volatility convexities corresponding to the first and second options, and wherein the second criterion requires that a difference between the first and second corrections is proportional to a difference between first and second delta convexities corresponding to the first and second options.

17. The method of claim 16, wherein the first criterion requires that the sum of the first and second corrections is proportional to the sum of the first and second volatility convexities according to a first proportionality function, which is based on said delta, and wherein the second criterion requires that the difference between the first and second corrections is proportional to the difference between the first and second delta convexities according to a second proportionality function, which is based on said delta.

18. The method of claim 17, wherein at least one of the first and second proportionality functions includes a predefined combination of said delta and one or more market-based parameters, the method comprising determining said market-based parameters based on said second input data.

19. The method of claim 18, wherein the first and second proportionality functions are decreasing functions of said delta.

20. The method of claim 15, wherein the first and second criteria require satisfying the following equations:

$$\zeta_C^\Delta + \zeta_P^\Delta = A(\Delta) \cdot Vega^\Delta d_1^2 \left( \frac{1}{\sigma_{K_{Call}}} + \frac{1}{\sigma_{K_{Put}}} \right)$$

$$\zeta_C^\Delta - \zeta_P^\Delta = B(\Delta) \cdot Vega^\Delta \frac{d_1}{S\sqrt{t}} \left( \frac{1}{\sigma_{K_{Call}}} + \frac{1}{\sigma_{K_{Put}}} \right)$$

wherein $\zeta_C^\Delta$ and $\zeta_P^\Delta$ denote said first and second corrections, wherein $\Delta$ denotes said delta, wherein $A(\Delta)$ and $B(\Delta)$ denote first and second functions of $\Delta$, respectively, wherein $Vega^\Delta$ denotes a vega of the first and second options, wherein t denotes a time to expiration of said first option, wherein $d_1$ denotes a predefined function of the time to expiration of said first option, wherein S denotes a price of said underlying asset, and wherein $\sigma_{K_{Call}}$ and $\sigma_{K_{Put}}$ denote a volatility of the first option and a volatility of the second option, respectively.

21. The method of claim 15 comprising determining a price of an exotic option on said underlying asset based on the price of said first option according to the pricing model.

22. The method of claim 15, wherein said first input data comprises an indication of at least one parameter selected from the group consisting of a type of said first option, an expiration date of said first option, a trigger for said first option, and a strike of said first option.

23. The method of claim 15, wherein said second input data comprises an indication of at least one parameter selected from the group consisting of a spot value, a forward rate, an interest rate, a volatility, an at-the-money volatility, a delta risk reversal, a delta butterfly, a delta strangle, a 10 delta risk reversal, a 10 delta butterfly, a 10 delta strangle, a 25 delta risk reversal, a 25 delta butterfly, a 25 delta strangle, a caplet, a floorlet, a swap rate, a security lending rate, and an exchange price.

24. The method of claim 15 comprising executing a trade of the first option based on the price of said first option according to the pricing model.

25. A product including a non-transitory storage medium having stored thereon instructions that, when executed by a machine, result in:

receiving first input data corresponding to at least one parameter defining an option to be priced on an underlying asset;

receiving second input data corresponding to at least one current market condition relating to said underlying asset; and determining, based on said first and second input data, a price of the option according to a pricing model, wherein the price of a first option according to the pricing model satisfies a first criterion and a second criterion, the first criterion relates to a sum of a first correction corresponding to the first option and a second correction corresponding to a second option, the second criterion relates to a difference between the first correction corresponding to the first option and the second correction corresponding to the second option, wherein the second option represents a position opposite to a position of the first option and has a same absolute delta value as the first option, wherein the first correction relates to a difference between the price of the first option according to the pricing model and a price of the first option according to a Black-Scholes model with an At-The-Money (ATM) volatility, and wherein the second correction relates to a difference between the price of the second option according to the pricing model and a price of the second option according to the Black-Scholes model with the ATM volatility.

26. The product of claim 25, wherein the first criterion requires that the sum of the first and second corrections is proportional to a sum of first and second volatility convexities corresponding to the first and second options, respectively, and wherein the second criterion requires that a difference between the first and second corrections is proportional to a difference between first and second delta convexities corresponding to the first and second options, respectively.

27. The product of claim 25, wherein said first input data comprises an indication of at least one parameter selected from the group consisting of a type of said first option, an expiration date of said first option, a trigger for said first option, and a strike of said first option.

28. The product of claim 25, wherein said second input data comprises an indication of at least one parameter selected from the group consisting of a spot value, a forward rate, an interest rate, a volatility, an at-the-money volatility, a delta risk reversal, a delta butterfly, a delta strangle, a 10 delta risk reversal, a 10 delta butterfly, a 10 delta strangle, a 25 delta risk reversal, a 25 delta butterfly, a 25 delta strangle, a caplet, a floorlet, a swap rate, a security lending rate, and an exchange price.

\* \* \* \* \*